US006901479B2

(12) United States Patent
Tomita

(10) Patent No.: US 6,901,479 B2
(45) Date of Patent: May 31, 2005

(54) DISK ARRAY APPARATUS FOR AND METHOD OF EXPANDING STORAGE CAPACITY DYNAMICALLY

(75) Inventor: Haruo Tomita, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 10/353,042

(22) Filed: Jan. 29, 2003

(65) Prior Publication Data

US 2003/0145167 A1 Jul. 31, 2003

(30) Foreign Application Priority Data

Jan. 31, 2002 (JP) ....................................... 2002-023919

(51) Int. Cl.$^7$ ............................................... G06F 12/02
(52) U.S. Cl. ..................................................... 711/114
(58) Field of Search .......................... 711/111, 112, 114, 711/165; 714/5, 6, 7, 8

(56) References Cited

U.S. PATENT DOCUMENTS

| | | | | |
|---|---|---|---|---|
| 5,524,204 | A | * 6/1996 | Verdoorn, Jr. ................. | 714/6 |
| 5,758,118 | A | * 5/1998 | Choy et al. .................. | 711/114 |
| 5,875,457 | A | * 2/1999 | Shalit ......................... | 711/114 |
| 6,035,373 | A | * 3/2000 | Iwata ......................... | 711/114 |
| 6,058,489 | A | * 5/2000 | Schultz et al. ................ | 714/7 |
| 6,219,752 | B1 | 4/2001 | Sekido | |
| 6,233,648 | B1 | 5/2001 | Tomita | |
| 6,282,619 | B1 | * 8/2001 | Islam et al. ................. | 711/165 |
| 6,304,941 | B1 | * 10/2001 | Lyons et al. ................. | 711/114 |
| 6,347,359 | B1 | * 2/2002 | Smith et al. ................. | 711/114 |

FOREIGN PATENT DOCUMENTS

| | | |
|---|---|---|
| JP | 7-141121 | 6/1995 |
| JP | 2000-10738 | 1/2000 |

OTHER PUBLICATIONS

Rosenblum, M. et al., "The Design and Implementation of a Log–Structured File System", Electrical Engineering and Computer Sciences, Computer Science Division, Univeristy of California, pp. 1–15, Jul. 24, 1991.

Haruo Tomita, "Disk Array Apparatus and Parity Procesing Method Therein" filed Aug. 30, 2002 U.S. Appl. No. 10/231, 247.

Haruo Tomita, "Disk Array Apparatus and Data Restoring Method Used Therein" filed Aug. 30, 2002 U.S. Appl. No. 10/231,027.

Haruo Tomita, "Disk Array Apparatus and Data Update Method Therein" filed Aug. 30, 2002 U.S. Appl. No. 10/231, 157.

Haruo Tomita, "Disk Array Apparatus and Data Backup Method Used Therein" filed Aug. 30, 2002 U.S. Appl. No. 10/231,349.

\* cited by examiner

*Primary Examiner*—Kevin L. Ellis
(74) *Attorney, Agent, or Firm*—Finnegan, Henderson, Farabow, Garrett & Dunner, L.L.P.

(57) ABSTRACT

A controller retrieves effective logical addresses sequentially according to a copy of an address translation table at the time of the start of storage capacity expansion in the process of expanding the storage capacity of a disk array by adding a disk drive to the disk array. The controller stores the data in the logical address into a restructured write buffer each time an effective logical address is retrieved. The controller writes one stripe worth of data blocks including one stripe of logical blocks and a logical address tag block into an empty area different from the area in which the data to be updated has been stored in the data array each time one stripe worth of logical blocks of data is accumulated in the write buffer.

19 Claims, 15 Drawing Sheets

| ST# | ST# |
|---|---|
| ST1 | 123 |
| ST2 | 11 |
| ⋮ | ⋮ |

| LA# | ST# | BLK# | TS# |
|---|---|---|---|
| L0 | NULL | NULL | 99 |
| L1 | NULL | NULL | 999 |
| L2 | 7000 | 14 | 21 |
| ⋮ | ⋮ | ⋮ | ⋮ |
| Li | 10000 | 2 | 10000 |
| ⋮ | ⋮ | ⋮ | ⋮ |
| Lj | NULL | NULL | NULL |
| ⋮ | ⋮ | ⋮ | ⋮ |

DISK ARRAY APPARATUS FOR AND METHOD OF EXPANDING STORAGE CAPACITY DYNAMICALLY

CROSS-REFERENCE TO RELATED APPLICATIONS

This application is based upon and claims the benefit of priority from the prior Japanese Patent Application No. 2002-023919, filed Jan. 31, 2002, the entire contents of which are incorporated herein by reference.

BACKGROUND OF THE INVENTION

1. Field of the Invention

This invention relates to a disk array apparatus with a disk array composed of a plurality of disk drives, and more particularly to a disk array apparatus for and a method of expanding storage capacity dynamically which are suitable in expanding the storage capacity of a disk array by adding disk drives.

2. Description of the Related Art

One known disk storage management method is called a Log Structured File System. The log structured file system has been described in detail in, for example, the following reference: "The Design and Implementation of a Log-Structured File System," Mendel Rosenblum and John K. Ousterhout, ACM Transaction on Computer systems, February 1992. The log structured file system described in the reference has the following two characteristics: one characteristic is that the update data requested by the host computer is accumulated and then written simultaneously into another continuous area in which no effective data is stored, and the other is that the area in which the data before update was stored is made ineffective.

On the other hand, U.S. Pat. No. 6,219,752 and U.S. Pat. No. 6,233,648 have disclosed techniques (hereinafter, referred to as the prior art) where a log structured file system is applied to a disk array apparatus. In the prior art, an address translation table is used for converting the logical address specified by the access request made by the host computer into a physical address indicating the location of physical data in the disk array. The logical address is a data address on the disk array recognized by the host computer.

An example of applying a log structured file system to a dynamic expansion of the storage capacity in a disk array apparatus has been described in paragraph 0195–0198 in the right column on page 34 in Jpn. Pat. Appln. KOKAI Publication No. 2000-10738. A dynamic expansion of the storage capacity in the disk array apparatus means expanding the storage capacity of the disk array without stopping the system. The technique for expanding the storage capacity (hereinafter, referred to a first storage capacity expanding technique) described in Jpn. Pat. Appln. KOKAI Publication No. 2000-10738 is characterized in that "0" is written into all of the data areas of the disk drives added to the disk array apparatus. Writing "0" enables the data areas of the added disk drives to be incorporated into the disk array apparatus without recalculating the parity. In the first storage capacity expanding technique, to expand the storage capacity of the disk array by adding a disk drive to the disk array apparatus, there is no need to move the data all over the data areas constituting the disk array. In the first storage capacity expanding technique, however, it is necessary to write "0" into all of the data areas of the added disk drives, that is, to make all of the data blocks ineffective. Consequently, the first storage capacity expanding technique requires a lot of time, depending on the storage capacity of the added disk drives. Moreover, the first storage capacity expanding technique has another problem: since the mapping relationship between the logical addresses and the physical addresses after the expansion of the storage capacity is not optimized, the performance of sequential access decreases.

On the other hand, Jpn. Pat. Appln. KOKAT Publication No. 7-141121 has disclosed an example of expanding the storage capacity dynamically in a disk array apparatus to which a log structured file system has not been applied. In the example, by storing the write locations during the relocation of data, it is determined whether the I/O (input/output) request was made by the host before or after the expansion of the storage capacity. In the storage capacity expanding technique (hereinafter, a second storage capacity expanding technique) disclosed in Jpn. Pat. Appln. KOKAI Publication No. 7-141121, it is necessary to change the mapping of logical addresses onto physical addresses as a result of the addition of a disk drive. The change of the mapping involves regenerating the parity data (redundant data) and relocating the data including the parity data. Therefore, in the second storage capacity expanding technique, the following problem arises: the relocation of data causes inputs to and outputs from the disk drives to take place, which degrades the performance of the input and output to and from the disk array apparatus after the expansion of the storage capacity. Furthermore, the input and output to and from the disk drive as a result of the data relocation depend on the storage capacity of the disk drive.

BRIEF SUMMARY OF THE INVENTION

It is accordingly an object of the present invention to provide a disk array apparatus for and a method of expanding storage capacity dynamically which need not move the data corresponding to at least ineffective logical addresses to expand the storage capacity of the disk array by adding a disk drive, thereby shortening the time required to expand the storage capacity.

According to an aspect of the invention, there is provided a disk array apparatus with a disk array which has a redundant disk configuration composed of a plurality of disk drives and is recognized as a single logical disk drive by a host computer. The disk array apparatus an address translation table, updating means, generating means, a write buffer, restructuring means, retrieving means, reading means, storing means, and writing means. In the address translation table, address translation information for translating the logical address of an effective logical block used by the host computer into a physical address in the disk array in which the logical block has been stored is set. The updating means updates the address translation table when the disk array is written into in stripes. The generating means generates a copy of the address translation table. The copy of the address translation table is generated at the time of a storage capacity expanding process of expanding the storage capacity of the disk array by adding a disk drive to the disk array. The write buffer is used for storing temporarily the data to be written into the disk array. The write buffer is secured on a nonvolatile memory. The restructuring means restructures the write buffer at the time of the storage capacity expanding process so that the writhe buffer may have a size corresponding to the stripe size after the expansion of the storage capacity of the disk array. The retrieving means retrieves an effective logical address according to the copy of the address translation table. The reading means reads the data on a physical stripe from the disk array. The physical stripe includes the data block with the physical address corresponding to the retrieved effective logical address. The storing means stores into the restructured write buffer the data in the logical blocks corresponding to all the effective logical addresses included in the physical stripe read by the reading means. The writing means writes one stripe worth of data blocks corresponding to the stripe size after the expansion of the storage capacity into an empty area different from the area in which the data to be updated has been stored in the disk array. The one stripe worth of data blocks includes one stripe worth of logical blocks corresponding to the stripe size after the expansion of the storage capacity. The writing is done by the writing means each time one stripe worth of logical blocks of data corresponding to the stripe size after the expansion of the storage capacity is accumulated in the restructured write buffer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 shows an example of the data structure of the stripe table 41 of FIG. 1;

FIG. 10 shows an example of entry information in an address translation table 32 after the storage capacity of the disk array 20 is expanded;

DETAILED DESCRIPTION OF THE INVENTION

Figure 1:
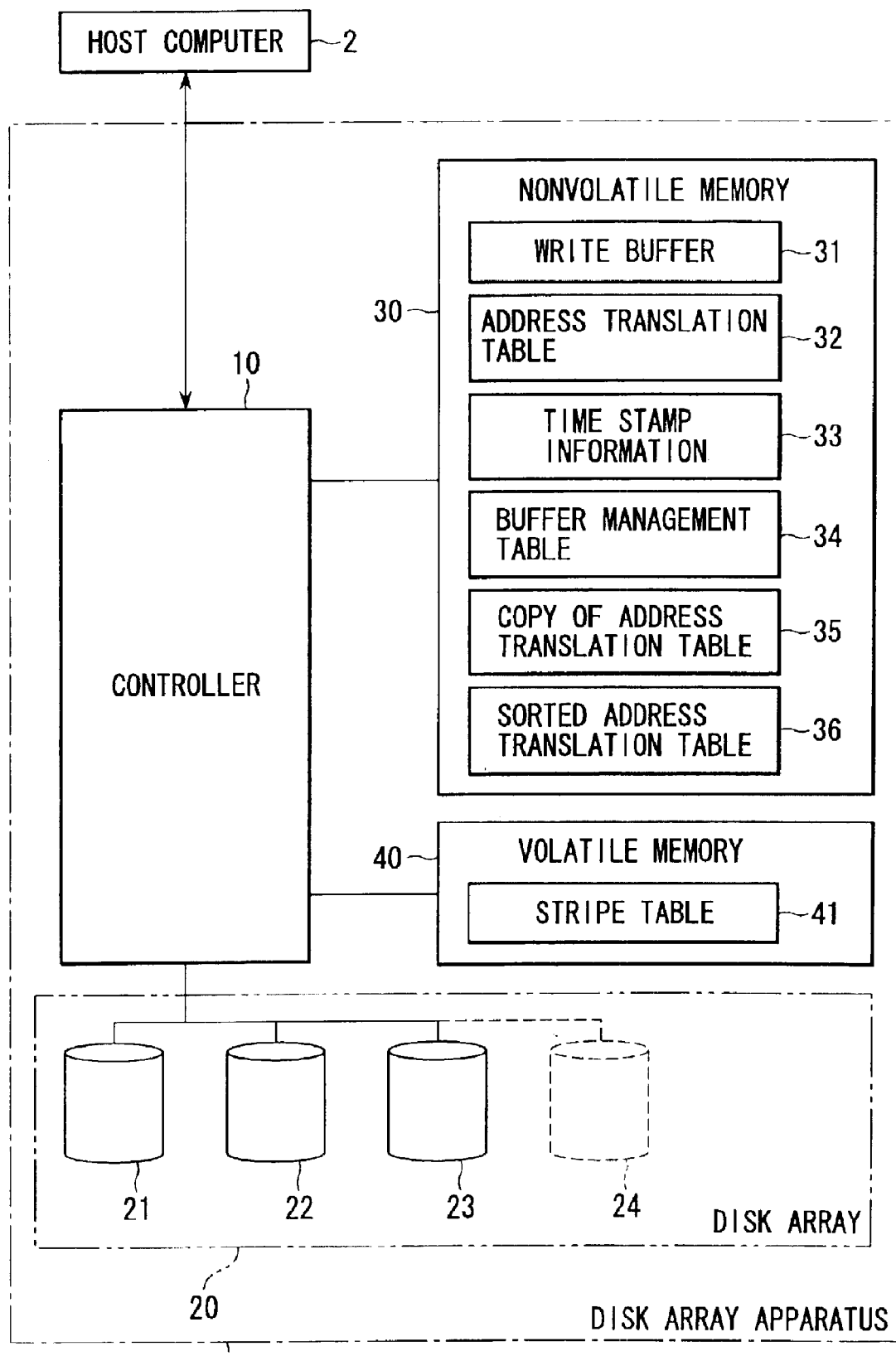
FIG. 1 is a block diagram showing the configuration of a computer system including a disk array apparatus according to an embodiment of the present invention.

Hereinafter, referring to the accompanying drawings, an embodiment of the present invention will be explained. FIG. 1 is a block diagram showing the configuration of a computer system including a disk array apparatus 1 to which a log structured file system according to an embodiment of the present invention is applied. The computer system of FIG. 1 comprises a disk array apparatus 1 and a host computer 2 using the disk array apparatus 1. The disk array apparatus 1 comprises a controller 10, a disk array 20, a nonvolatile memory 30, and a volatile memory 40. The disk array 20, nonvolatile memory 30, and volatile memory 40 are each connected to the controller 10.

The disk array 20 is composed of a plurality of disk drives, for example, three disk drives 21, 22, 23. The disk array 20 has a redundant disk configuration so that, even if any one of the disk drives 21, 22, 23 fails, the data in the troubled disk drive can be regenerated (or recovered). To simplify the explanation, it is assumed that the disk array 20 uses a redundant disk configuration of RAID level 4 and a specific one of the disk drives 21 to 23, for example, disk drive 23, is allocated as a parity disk drive for storing parity data. In the example of FIG. 1, to expand the storage capacity of the disk array 20, a disk drive 24 is newly added as an additional disk drive. After the disk drive 24 is added, the disk array 20 is composed of four disk drives 21 to 24.

The controller 10 is a disk array controller for controlling the disk array 20. The controller 10 is connected to the host computer 2. The host computer 2 recognizes the disk array 20 as a single logical disk drive. An interface between the host computer 2 and the controller 10 may be, for example, SCSI (Small Computer System Interface) or a PCI bus (Peripheral Component Interconnect Bus).

In the embodiment, explanation will be given, centering on the configuration of FIG. 1. It is clear that those skilled in this technical field can embody the present invention even from the configuration of another computer system derived from the configuration of FIG. 1, even if the details of the component parts are not explained. For example, to realize the controller 10, it is possible to apply the method of realizing a disk array controller described in paragraph 0042–0045 in the right column on page 25 in Jpn. Pat. Appln. KOKAI Publication No. 2000-10738. The method of realizing a disk array written in the publication is as follows:

1a) A disk array controller is realized as a part of the host computer. For example, a disk array controller is realized on the main board of the host computer.

1b) The disk array controller is realized in such a manner that it is added to an expansion slot of the computer.

For example, a disk array controller is provided in a PCI card that is to be inserted into a PCI slot of the computer.

1c) A disk array controller is realized outside the host computer. This method corresponds to a method realizing the controller 10 shown in FIG. 1 applied to the embodiment.

1d) A disk array controller is realized in software on the host computer.

Before a detailed explanation of the configuration of FIG. 1, the terms used in the embodiment will be explained.

2a) Logical block

A logical block is a data block that can be recognized by the host computer 2. More specifically, a logical block is a data block on a logical disk area in the disk array 20.

2b) Physical block

A physical block is a physical bock on the disk array 20. More specifically, a physical block is a data block on a physical disk area in the disk array 20. The size of a data block, which is predetermined, is constant.

2c) Logical address

A logical address is a data address in the disk array 20 that can be recognized by the host computer 2. In the embodiment, a logical address is used as a logical block address that indicates the location of a data block on the logical disk area in the disk array 20, that is, the location of a logical block.

2d) Physical address

A physical address is used to indicate the physical location of data (or data block) in the disk array 20. A physical address is a physical block address that indicates the physical location of a data block in the disk array 20, that is, the location of a physical block. A physical address is composed of a physical stripe number and a physical block number, which will be explained later.

2e) Logical address tag

A logical address tag includes a logical address corresponding to each logical block and a time stamp.

2f) Parity block

A parity block is a data block composed of redundant data corresponding to a plurality of logical blocks.

2g) Logical address tag block

A logical address tag block is a data block that includes a logical address tag.

2h) Logical block number

A logical block number is the number of a data block in the disk array that can be recognized by the host computer 2.

2i) Physical block number

A physical block number is a number indicating the relative position of a data block in a physical stripe in the disk array 20. A physical block number is a number unique to a disk drive constituting the disk array 20.

In the nonvolatile memory 30 of the disk array apparatus 1, there are provided a write buffer 31, an address translation table 32, time stamp information 33, and a buffer management table 34. Furthermore, in the nonvolatile memory 30, a copy 35 of the address translation table and a sorted address translation table 36 explained later are provided, if necessary. In the volatile memory 40, there is provided a stripe table 41 explained later which is used in a second modification of the embodiment.

The write buffer 31 is used to store the data to be written into the disk array so that it may have a log structure. The address translation table 32 is a translation map used to translate logical addresses (or logical block addresses) into physical addresses (or physical block addresses). In the embodiment, the address translation table 32 is used to translate data addresses (or data block addresses) in the disk array 20 that can be recognized by the host computer 2, or logical addresses, into addresses indicating the locations of physical data (or data blocks) in the disk array 20, or physical addresses. The time stamp information 33 is chiefly used to maintain the time sequence of writing. The time stamp information 33 includes a time stamp, a stripe generation number, and the number of disk drives constituting the disk array 20 (see FIG. 2). The time stamp is time information that represents the point in time that one stripe of data is written or the point in time that the storage capacity of the disk array 20 is expanded. The stripe generation number represents the number of storage capacity expansions and is updated when the storage capacity is expanded. A checksum for the time stamp information 33 is added to the time stamp information 33. The buffer management table 34 is used to hold information about empty areas in the write buffer 31 and information about the logical addresses of the write data stored in the buffer 31. The copy 35 of the address translation table is generated on the basis of the address translation table 32 in the process of expanding the storage capacity of the disk array 20.

Each of the disk drives 21 to 23 constituting the disk array 20 writes data in units of K (where K is an integer larger than 0) times the size (or the block side) of one data block. That is, each disk drive writes data in K block units. At this time, K blocks whose relative positions are physically the same on the respective disk drives 21 to 23 are written into with the same timing. The K blocks whose relative locations are physically the same on the respective disk drives 21 to 23 are treated as a stripe segment, which is a component element of one physical stripe. Here, it is assumed that the disk array 20 is composed of an N number of disk drives (where N is an integer larger than one) and that the size of one stripe segment is K data blocks. In this case, one stripe (physical stripe) is composed of N stripe segments, that is, N×K data blocks. More specifically, when the disk array 20 is used in a RAID level which requires no generation of parity data, one stripe is composed of (N×K−1) logical blocks and one logical address tag block TG. Examples of such a RAID level are RAID level 0, RAID level 1, and RAID level 10. On the other hand, when the disk array 20 is used in a RAID level which requires the generation of parity data, one stripe is composed of [(N−1)×K−1] (where N is an integer larger than 2) logical blocks, a logical address tag block TG, and a K number of parity blocks. Examples of such a RAID level are RAID level 4, RAID level 5, and RAID level 50. Taking into account the efficiency of access to a disk drive, it is desirable that the size of a stripe segment (that is, the number of blocks included in a stripe segment) should be close to the length of one track on the disk drive.

In the embodiment, the controller 10 causes the host computer 2 to recognize a storage capacity smaller than the total storage capacity of the disk array 20 as the storage capacity of the disk array 20. The total storage capacity of the disk array 20 is the sum total of the actual storage capacity of each of the disk drives 21 to 23 constituting the disk array 20. To make such recognition possible, the controller 10 informs the host computer 2 of a storage capacity smaller than the total storage capacity, when being asked the storage capacity by the host computer 2. As a result, in addition to the storage area from and into which the host computer 2 can read and write data logically, an extra storage area is secured in the storage area of the disk array 20. The extra area is called an empty area. Each stripe in the empty area is called an empty stripe. That is, in the embodiment, even when all of the storage area from and into which the host computer 2 can read and write data logically is used, an empty area never fails to be secured. The physical position of the empty area in the disk array 20 is not fixed. When the logical area the host computer 2 uses is small, the storage capacity of the empty area becomes larger than that of the extra storage capacity.

It is assumed that the disk drive 24 is added to the disk array 20 to expand the storage capacity of the disk array 20. In this case, writing is done in stripe segments in the added disk drive 24. After the storage capacity of the disk array 20 is expanded, the disk array 20 is composed of four disk drives, or the disk drives 21 to 23 and the added disk drive 24. In this case, data is written into stripe segments in the physically same position on the disk drives 21 to 24 with the same timing. It is clear that, when the number of disk drives constituting the disk array 20 is increased from 3 to 4, the number of stripe segments constituting one stripe increases from 3 to 4.

The controller 10 controls access to the disk array 20 according to a control program previously stored in a storage unit, such as ROM (not show). The controller 10 further manages the write buffer 31, address translation table 32, time stamp information 33, buffer management table 34, and others on the nonvolatile memory 30 according to the control program. The controller 10 employs the same high-speed writing method as disclosed in U.S. Pat. No. 6,219,752 or U.S. Pat. No. 6,233,648. Specifically, when the host computer 2 makes an update (write) request, the controller 10 accumulates the update data in the write buffer 31 instead of rewriting the contents of the corresponding old data area in the disk array 20. More specifically, the controller 10 divides the update data into blocks and writes the blocks closely into an empty area of the write buffer 31. When the generation of parity data is not necessary, one stripe (that is, (N×K) data blocks) worth of storage area on the nonvolatile memory 30 is allocated to the write buffer 31. When the generation of parity data is necessary, [one stripe−one stripe segment] (that is, (N−1)×K data blocks) worth of storage area on the nonvolatile memory 30 is allocated to the write buffer 31. Therefore, in a case where the disk array 20 uses a redundant disk configuration of RAID level 4, the generation of parity data is necessary. In this case, (N−1)×K data blocks worth of storage area are allocated to the write buffer 31.

The controller 10 generates a logical address tag block TG at the time when the number of data blocks (logical blocks) stored in the write buffer 31 reaches the number of blocks equivalent to [one stripe−(one stripe segment+one data block)]. The logical address tag block TG is composed of a logical address tag and time stamp information TS. The controller 10 writes the generated logical address tag block TG into the write buffer 31. Then, the controller 10 generates one stripe segment of parity data (or a K number of parity blocks) from the data including the generated logical address tag block TG stored in the write buffer 31. The number of blocks of the data including the logical address tag block TG is the number of blocks equivalent to [one stripe−one stripe segment] (that is, (N−1)×K blocks). Then, the controller 10 starts to write one stripe of data composed of [one stripe−one stripe segment] worth of data and the generated one stripe segment of parity data into the disk array 20 simultaneously. In the write operation, one stripe of data is written into physically consecutive areas in the empty areas on the N number of disk drives (in the example of FIG. 1 where N=3, three disk drives 21 to 23) according to a striping rule corresponding to the number of disk drives constituting the disk array 20. The consecutive areas are different from the areas that hold the data to be updated.

The time stamp information TS in the logical address tag block TG applied in the embodiment is composed of a time stamp, a stripe generation number, the number of disk drives, and a checksum. The time stamp, stripe generation number, and the number of disk drives included in the time stamp information 33 on the nonvolatile memory 30 are used as the time stamp, stripe generation number, and the number of disk drives in the time stamp information TS. The time stamp information 33 is information added as part of time stamp information TS about the stripe when the write data from the host computer 2 is actually written into the disk array 20 in stripes. The time stamp in the time stamp information 33 is used to determine the order in which data is written in the disk array 20. For this reason, the value of the time stamp in the time stamp information 33 is incremented by one each time the data in the write buffer 31 is written into the disk array 20. Thus, by referring to the time stamp included in the time stamp information TS on the stripe, it is possible to determine whether the write data is new data or old data. The checksum is calculated from each logical address included in the logical address tag block TG and the time stamp, stripe generation number, and number of disk drives included in the time stamp information TS. As explained later, the stripe generation number and checksum are used to determine whether the corresponding logical address tag block TG belongs to an old stripe before the expansion of the storage capacity of the disk array 20 or to a new stripe after the expansion of the storage capacity.

Figures 2, 3:
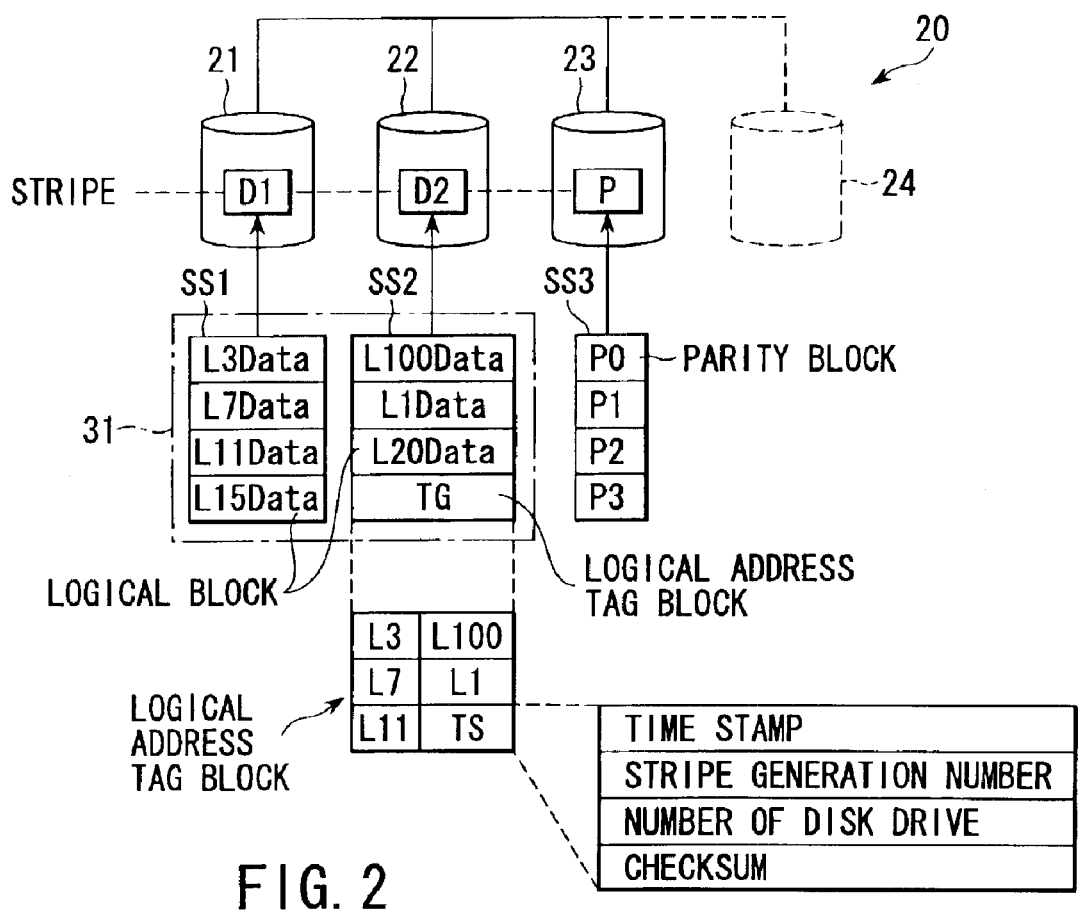
FIG. 2 shows an example of one stripe of data and the way the one stripe of data is written into disk drives 21 to 23 in a disk array 20.
FIG. 3 shows an example of the data structure of an address translation table 32 in FIG. 1.

FIG. 2 shows an example of one stripe of data (for K=3) prepared by the controller 10 and the way the one stripe of data is written into the disk drives 21 to 23 in the disk array 20. The example of FIG. 2 shows the way three stripe segments SS1, SS2, and SS3 are written simultaneously into empty areas in the disk drives 21, 22, 23 as data items D1, D2, and P constituting one stripe. Here, stripe segment SS1 is composed of logical blocks (L3Data, L7Data, L11Data, and L15Data) with logical addresses L3, L7, L11, and L15 respectively. Stripe segment SS2 is composed of logical blocks (L100Data, L1Data, and L20Data) with logical addresses L100, L1, and L20 and a logical address tag block (TG). Stripe segment SS3 is composed of parity blocks P0, P1, P2, and P3. Parity block P0 is a parity block corresponding to logical blocks with logical addresses L3 and L100. Parity block P1 is a parity block corresponding to logical blocks with logical addresses L7 and L1. Parity block P2 is a parity block corresponding to logical blocks with logical addresses L11 and L20. Parity block P3 is a parity block corresponding to a logical block with logical address L15 and the logical address tag block TG. In this example, parity block P0 is generated by the exclusive OR (XOR) of logical blocks with logical addresses L3 and L100. Parity block P1 is generated by the exclusive OR of logical blocks with logical addresses L7 and L1. Parity block P2 is generated by the exclusive OR of logical blocks with logical addresses L11 and L20. Parity block P3 is generated by the exclusive OR of a logical block with logical address L15 and the logical address tag block TG.

FIG. 3 shows an example of the data structure of the address translation table 32 placed on the nonvolatile memory 30. In the example of FIG. 3, each entry of the address translation table 32 corresponds to each unique logical address. The i-th entry (i=0, 1, 2, . . . ) of the table 32 is caused to correspond to logical address Li of the logical block i, taking into account the efficiency in referring to the address translation table 32. The number of entries of the is address translation table 32 coincides with the total number of logical addresses that can be recognized by the host computer 2. The information (or address translation information) in each entry i of the address translation table 32 is composed of the following items (or fields): logical address (or logical block address) LA#, physical stripe number ST#, physical block number BLK#, and time stamp TS#. The physical stripe number ST# indicates a physical stripe including a physical block on the disk array (physical disk area) to which a logical block indicated by the corresponding logical address (logical block address) LA# is allocated. Physical block number BLK# represents the relative position of the physical block in the physical stripe indicated by physical stripe number ST#. Time stamp TS# is information used to manage the time sequence in which the data block with the corresponding logical address LA# was written into the disk array 12. When the i-th entry of the address translation table 32 is caused to correspond to logical address i as in the embodiment, the logical address i can refer to the corresponding i-th entry. Therefore, it is not always necessary to prepare items for logical addresses in the entries of the address translation table 32. However, it is necessary to prepare an item for logical address in each entry of the address translation table 36 (see FIG. 1) which has been sorted in the order of effective logical addresses and will be used in a second modification of the embodiment explained layer.

In the initial state where the address translation table 32 is placed (or generated) on the nonvolatile memory 30, effective data (logical addresses) is set only in the item for logical address LA# of each entry of the table 32. At this time, NULL is set in the other items in each entry. The logical block address corresponding to an entry of the address translation table 32 in each of whose items NULL is set excluding logical address LA# indicates the logical address of an ineffective logical block not used by the host 2. In the example of FIG. 3, logical address La becomes the logical address for the ineffective logical block. The logical address corresponding to an entry of the address translation table 32 in each of whose items data other than NULL is set excluding logical address LA# indicates the logical address for an effective logical block used by the host 2. In the example of FIG. 3, logical addresses L0, L1, and L2 are the logical addresses for effective logical blocks. Hereinafter, to simplify the explanation, the expressions ineffective logical addresses and effective logical addresses may be used. Alternatively, logical addresses may be represented as being effective or ineffective.

When writing one stripe of data into empty areas of the disk drives 21 to 23 constituting the disk array 20, the controller 10 updates the address translation information set in the entry of the address translation table 32 specified by the logical address of the logical block for each logical block in the stripe. That is, the disk array 20 updates the physical stripe number and physical block number included in the relevant address translation information into the physical stripe number and physical block number indicating the physical data location on the disk array 20 into which the corresponding logical block is actually written. Moreover, the controller 10 updates the time stamp in the address translation information. As a result, when executing a read request or a write request made by the host computer 2, the controller 10 can translate logical address LA# (logical block address) specified in the request into a physical address (physical block address) composed of physical stripe number ST# and physical block number BLLK# according to the address translation table 32.

Figure 4:
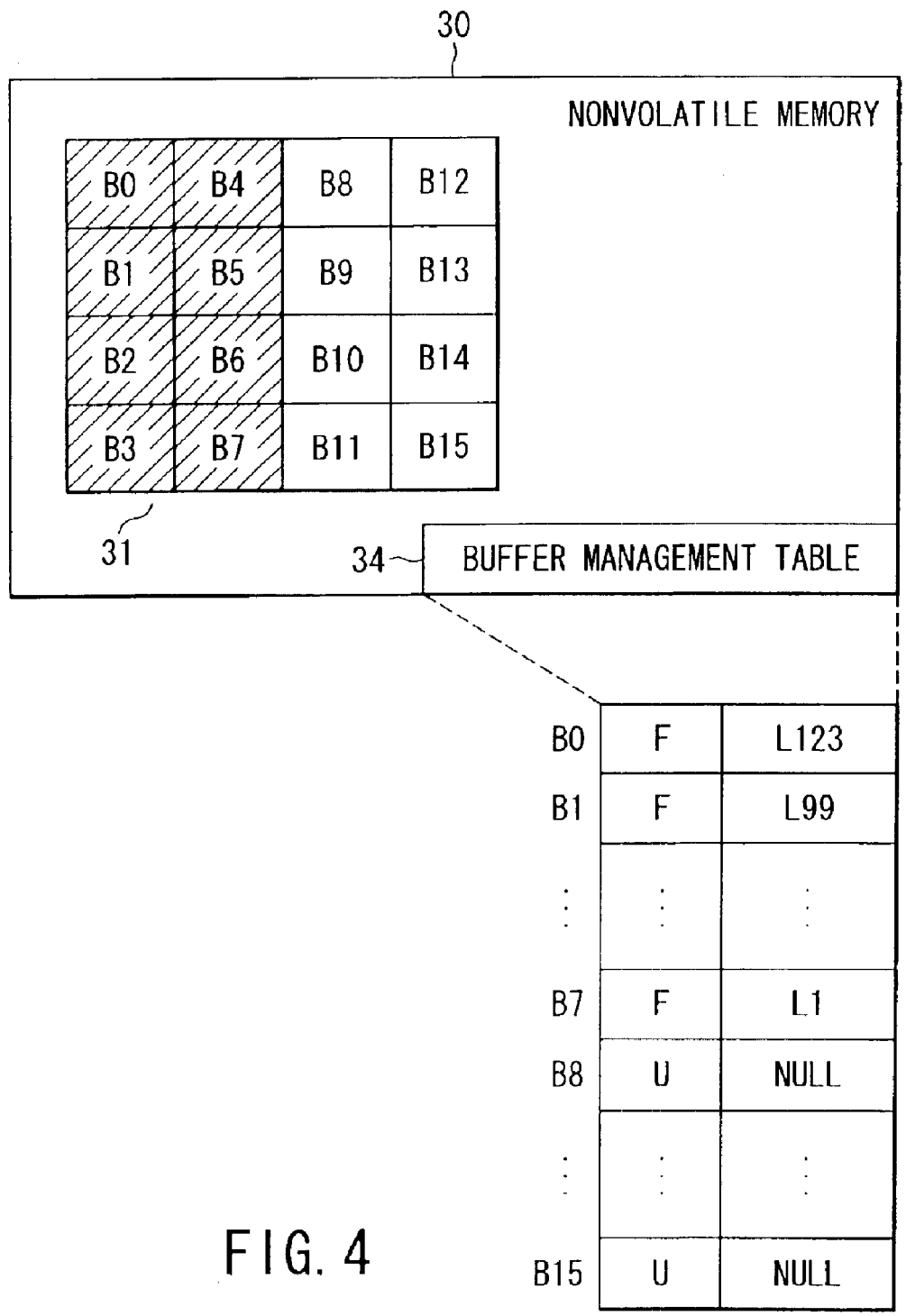
FIG. 4 shows an example of the relationship between a write buffer 31 and a buffer management table 34 which are arranged on a nonvolatile memory 30.

FIG. 4 shows an example of the relationship between the buffer 31 and buffer management table 34 placed on the nonvolatile memory 30. When the host computer 2 requests the controller 10 to write data into the disk array 20, the controller 10 does not write the requested write data into the disk array 20 immediately. Instead, the controller 10 divides the requested write data into blocks (logical blocks) and stores them sequentially in the write buffer 31 so as to squeeze into the buffer 31. After the expansion of the storage capacity, the area of the write buffer 31 is changed according to the block size of the added disk drive 24.

When writing the write data into the write buffer 31 in blocks, the controller 10 stores the logical addresses of all of the logical blocks constituting the write data into buffer management table 34. Here, it is assumed that the entry number of an entry in the buffer management table 34 into which the logical address of one logical block is written is i. The entry whose entry number is i, that is, entry i, corresponds to block area Bi in the write buffer 31 into which the logical block is written. The entry i includes a flag field that indicates whether effective data is stored in the block area Bi in the write buffer 21 (that is, whether the block area Bi is an empty area). A flag "U" is set in the entry i in the buffer management table 34 corresponding to the empty block area Bi in the write buffer 31. The flag "U" indicates that the block area Bi in the write buffer 31 is empty. When storing a logical address in the entry i in the buffer management table 34, the controller 10 sets a flag "F" in the flag field in the entry i. The flag F indicates that effective data is stored in block area Bi in the write buffer 31. Therefore, referring to the buffer management table 34, the controller 10 can determined the next block into which the write data requested by the host computer 2 should be stored. In the example of FIG. 4, the buffer management table 34 shows that the write data has been stored in B0 to B7 of the block areas B0 to B15 in the write buffer 31. The buffer management table 34 also shows that the addresses of the logical blocks stored in the block areas B0, B1, . . . , B7 are L123, L99, . . . , L1, respectively.

Next, the operation of the disk array apparatus 1 shown in FIG. 1 will be explained. First, a write operation in the disk array apparatus 1 will be described briefly, using a case where the disk drive 24 is added to the disk array 20, that is, where the storage capacity of the disk array 20 is expanded. It is assumed that the controller 10 in the disk array apparatus 1 has accepted a write (or update) request made by the host computer 2. In this case, the controller 10 receives the data to be written and the logical address for the starting location of the data and information about the size of the data from the host computer 2. Then, the controller 10 divides the write data (or update data) received from the host computer 2 into blocks and stores them closely in empty areas of the write buffer 31 on the nonvolatile memory 30. Here, the write buffer 31 is changed so as to have a size corresponding to the stripe size after the expansion of the storage capacity in the process at step S5 in a flowchart shown in FIG. 6A explained later. In addition, the controller 10 generates a logical address (or logical block address) for each block on the basis of information about the received logical address and size. The controller 10 stores the logical address for each block into the corresponding entry of the buffer management table 34. When writing the update data for the data already stored in the write buffer 31, the controller 10 replaces the old data in the write buffer 31 directly with the update data. By referring to the buffer management table 34, it is possible to determine whether the update data is written to replace the data stored in the write buffer 31. Specifically, the determination can be made by determining whether the corresponding logical block address is set in the buffer management table 34 and there is an entry with a flag "F."

It is assumed that, as a result of writing data into the write buffer 31 in blocks, the number of logical blocks constituting the write data stored in the buffer 31 has reached the number one block smaller than the number of logical blocks in one stripe after the expansion of the storage capacity. It should be noted that the number of logical blocks is not the number one block smaller than the number of data blocks in one stripe. In this case, the controller 10 generates a logical address tag block TG composed of a logical address tag and time stamp information TS. The logical address tag in the logical address tag block TG is composed of the logical addresses of logical blocks, smaller in numbers by one than the logical blocks included in one stripe. Each logical address in the logical address tag is a logical address stored in the associated entry provided in the buffer management table 34. This logical address is stored into the buffer management table 34 when the associated data block (logical block) is stored into the block area of the write buffer 31. On the other hand, the time stamp information TS in the logical address tag block TG is generated from the time stamp information 33 on the nonvolatile memory 30. The stripe generation number in the time stamp information 33 is incremented by one as a result of the expansion of the storage capacity.

The controller 10 stores the generated logical address tag block TG into the last block area (or logical address tag block area) in the write buffer 31. Then, the controller 10 generates a K number of parity blocks (that is, one stripe segment of parity data), when the generation of parity data is necessary as in the embodiment. That is, the controller 10 generates K parity blocks from (N−1)×K data blocks stored in the write buffer 31 at that time. Here, the (N−1)×K data blocks is composed of [(N−1)×K−1] logical blocks (that is, [the number of logical blocks in one stripe−1] logical blocks) and one logical address tag block TG. The controller 10 writes one stripe of data (N×K blocks) composed of the generated K parity blocks and (N−1)×K data blocks into the disk array 20. That is, the controller 10 writes one stripe of data into physically consecutive areas in empty areas different from the areas that hold the data to be updated on the disk drives 21 to 24 in the disk array 20.

Figure 5:
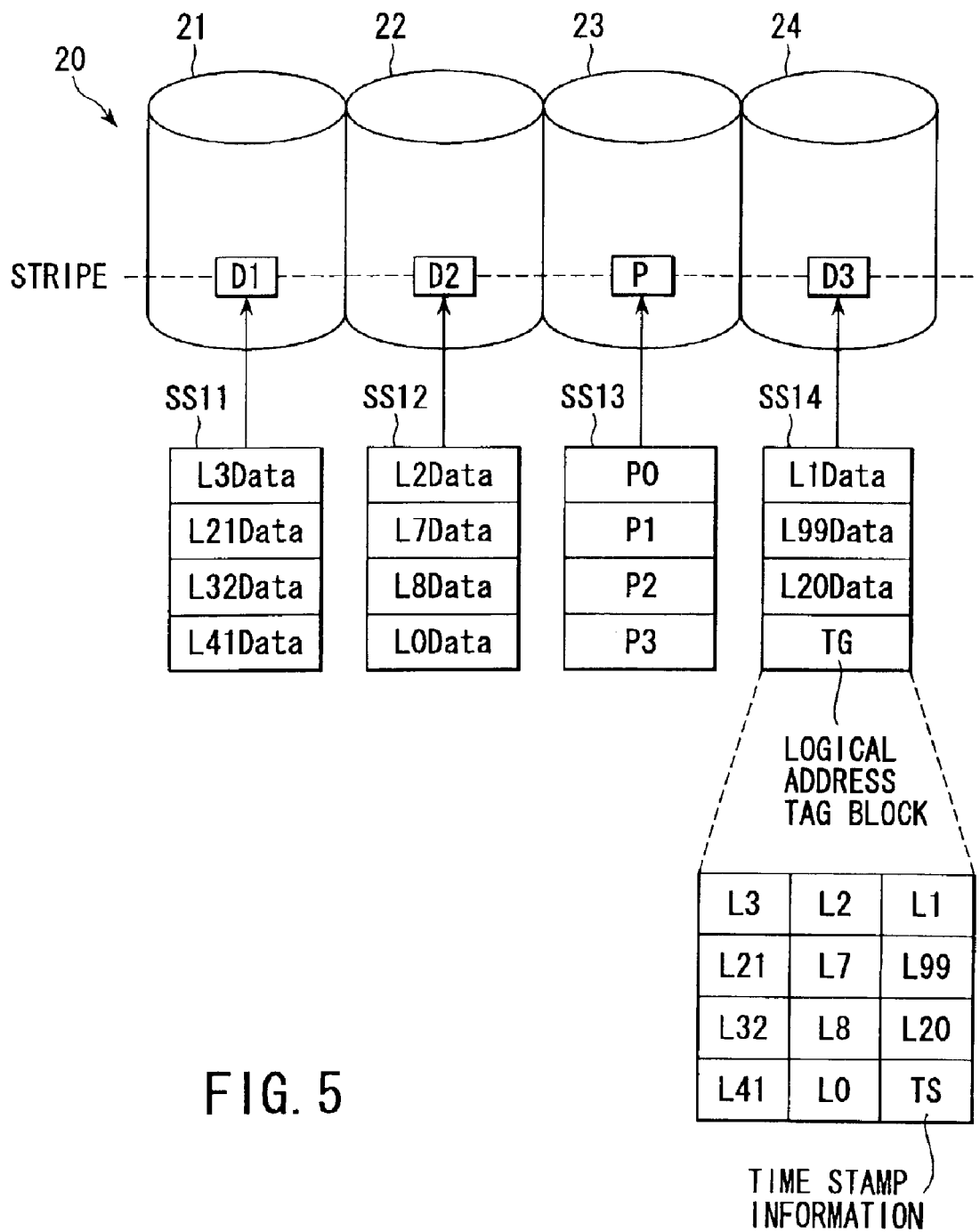
FIG. 5 shows an example of one stripe of data after the storage capacity expansion of the disk array 20 and the way the one stripe of data is written into disk drives 21 to 24 in the disk array 20.

FIG. 5 shows an example of one stripe of data after the expansion of the storage capacity of the disk array 20 and the way the one stripe of data is written into the disk drives 21 to 24 in the disk array 20. In the example of FIG. 5, four stripe segments SS11, SS12, SS13, and SS14 are written simultaneously in empty areas in the disk drives 21, 22, 23, and 24 in the form of data items D1, D2, P, and D3, each constituting one stripe. Here, stripe segment SS11 is composed of logical blocks (L3Data, L21Data, L32Data, and L41Data) with logical addresses L3, L21, L32, and L41, respectively. Stripe segment SS12 is composed of logical blocks (L2Data, L7Data, L8Data, and L0Data) with logical addresses L2, L7, L8, and L0, respectively. Stripe segment SS14 is composed of logical blocks (L1Data, L99Data, and L20Data) with logical addresses L1, L99, and L20 respectively and a logical address tag block TG. Stripe segment SS13 is composed of parity blocks P0, P1, P2, and P3. The parity block P0 is generated by the exclusive OR (XOR) of logical blocks with logical addresses L3, L2, and L1. The parity block P1 is generated by the exclusive OR of logical blocks with logical addresses L21, L7, and L99. The parity block P2 is generated by the exclusive OR of logical blocks with logical addresses L32, L8, and L20. The parity block P3 is generated by the exclusive OR of logical blocks with logical addresses L41 and L0 and a logical address block TG. Differently from the embodiment, when the generation of parity data is not necessary, one stripe worth of data blocks stored in the write buffer 31 at that time are written in physically consecutive areas in empty areas on the disk drives 21 to 24. The one stripe worth of data blocks are N×K data blocks composed of (N×K−1) logical blocks and one logical address tag block TG.

When writing one stripe of data into an empty area different from the area that holds the data to be updated on the disk array 20 after the expansion of the storage capacity, the controller 10 updates the address translation table 32 after the expansion of the storage capacity. That is, the controller 10 sets the relationship between the logical address of the logical block and the physical address representing the physical data location on the disk array 20 in which the logical block is written, in the address translation table 32 after the expansion of the storage capacity for each logical block in the one stripe. Therefore, the controller 10 determines the entry in the address translation table 32 corresponding to the logical address LA# of the logical block for each logical block in the stripe. Then, the controller 10 updates the physical block number BLK# and physical stripe number ST# in the determined entry into the number representing the physical block location in the physical stripe in which the corresponding logical block is actually written and the number of the physical stripe. At this time, the controller 10 increments by one the value of the time stamp included in the time stamp information 33 on the nonvolatile memory 30 and updates the time stamp TS# in the updated entry of the address translation table 32 on the basis of the time stamp after the increment.

Next, a storage capacity expanding process of expanding the storage capacity of the disk array 20 will be explained by reference to flowcharts shown in FIGS. 6A and 6B. It is assumed that the user of the computer system shown in FIG. 1 has added the disk drive 24 to the disk array 20. In this state, it is assumed that the user operates the host computer 2, which causes the controller 10 provided in the disk array apparatus 1 to perform a storage capacity expanding process. In this case, the controller 10 checks the buffer management table 34 to see if there is any data accumulated in the write buffer 31 (step S1). If there is some data accumulated in the write buffer 31 (YES in step S1), the controller 10 proceeds to step S2a. In step S2a, the controller 10 searches the individual entries excluding the last one in the buffer management table 34 for empty entries in which flag "U" is set in the flag field. Then, in step S2a, the controller 10 sets "0" in the empty blocks in the write buffer 31 corresponding to the searched empty entry. At this time, the state of the flag field in the empty entry of the buffer management table 34 is kept at "U." Next, the controller 10 generates a logical address tag block TG from the logical address and time stamp information 33 set in the entry whose flag field state is "F" among the entries of the buffer management table 34 (step S2b). Then, the controller 10 writes one stripe of data of the size before the expansion of the storage capacity, including the generated logical address tag block TG, simultaneously in empty areas of the disk drives in the disk array 20 (step S2c). Here, one stripe of data is composed of the data stored in the write buffer 31 and parity data.

Next, according to the writing of data into the disk drives 21 to 23 in step S2c (or the writing of data in stripes), the controller 10 updates the address translation table 32 on the nonvolatile memory 30 (step S3). When the controller 10 has updated the address translation table 32 in step S3 or has determined that there is no data accumulated in the write buffer 31 in step S1, it proceeds to step S4. In step S4, the controller 10 copies the address translation table 32 onto another area on the nonvolatile memory 30, thereby generating a copy 35 of the address translation table.

Next, the controller 10 changes the size of the write buffer 31 on the nonvolatile memory 30 so that the buffer may have a size corresponding to the stripe size after the expansion of the storage capacity, taking into account the change of the stripe size after the expansion of the storage capacity (step S5). Moreover, the controller 10 adds to the address translation table 32 as many entries as correspond to the number of blocks equivalent to an increase in the storage capacity as a result of the expansion of the storage capacity (step S6). The controller 10 executes the addition of entries, while keeping the contents of the address translation table 32 in the state before the change of the storage capacity. As a result, the address translation table 32 is restructured so as to operate properly after the expansion of the storage capacity.

Next, the controller 10 sets 0 as the initial value of variable i indicating the logical address of a logical block (step S7). Then, the controller 10 determines whether logical address i is effective, referring to the copy 35 of the address translation table on the nonvolatile memory 30 (step S8). That is, on the basis of the copy 35 of the address translation table, the controller 10 determines whether the logical block with logical address i is being used by the host computer 2. The determination is made by checking whether each item excluding logical address LA# in the entry of the copy 35 of the address translation table corresponding to logical address i is other than NULL. A flag indicating that the corresponding logical address is effective or ineffective may be set in each entry of the address translation table 32. In this case, it is possible to determine whether the corresponding logical address is effective by referring to the flag in each entry of the address translation table 32.

If logical address i is effective (YES in step S8), the controller 10 determines whether the data in logical address i has been written in the disk array 20 in the storage capacity expanding process (step S9). To make this determination efficiently, each entry of the address translation table 32 should be provided with a setting field for a flag that indicates whether the data in the logical block with the corresponding logical address has been newly written (relocated) in the disk array 20 or not been written in the disk array 20. If the data in logical address i has not been written into the disk array 20 (NO in step S9), the controller 10 proceeds to step S10. In step S10, the controller 10 reads the data in the physical stripe of the size before the expansion of the storage capacity corresponding to logical address i from the disk drives 21 to 23 in the disk array 20 (step S10). The physical stripe number ST# of the physical stripe is obtained from the entry of the copy 35 of the address translation table corresponding to logical address i.

Next, the controller 10 determines whether there is an unprocessed effective logical address j in the logical addresses indicating logical blocks included in the read-out physical stripe (step S11). This determination is made by searching for corresponding effective logical addresses in, for example, the order of entry from the address translation table 32 using the physical stripe number of the read-out physical stripe as a key. Furthermore, each entry of the address translation table 23 may be provided with a flag that indicates whether the logical address corresponding to the entry has been executed or not. In this case, the determination can be made by referring to the flag in searching for effective logical addresses. If there is an unprocessed effective logical address j (YES in step S11), the controller 10 takes out the logical block with logical address j from the physical stripe read in step S10 and writes data into the block (step S12). The writing in step S12 is done as follows in a normal sequence using a high-speed writing method as described in the prior art.

First, the controller 10 writes the logical block with logical address j closely in an empty area of the write buffer 31 on the nonvolatile memory 30. Normally, step S12 ends by writing data into the write buffer 31. However, if the number of blocks of data accumulated in the buffer 31 has reached a specific number of blocks as a result of writing the logical block with logical address j into the write buffer 31, the controller 10 further effects writing in step S12 as described bellow. Here, the specific number of blocks is the number of blocks equivalent to [one stripe−(one stripe segment+one block)]. First, the controller 10 generates a logical address tag block TG corresponding to write data equivalent to [one stripe−(one stripe segment+one block)] accumulated in the write buffer 31 (step S12a). Next, the controller 10 writes the generated logical address tag block TG into the last block area of the write buffer 31. Then, the controller 10 generates one stripe segment of parity data from the data (or [one stripe−one stripe segment] of data) on the write buffer 31 after the logical address tag block has been written. The one stripe segment of parity data is composed of as many parity blocks as correspond to one stripe segment. Then, the controller 10 writes simultaneously in the disk array 20 [one stripe one stripe segment] of data on the write buffer 31 and the generated one stripe segment of parity data (step S12b). Here, the disk drive 24 has been added to the disk array 20. Therefore, the data is written simultaneously into an empty stripe of the disk array 20 after the disk drive 24 is added, according to a new striping rule that corresponds to the disk array 20 after the expansion of the storage capacity. When writing the data simultaneously into the disk array 20 in step S12b, the controller 10 updates the restructured address translation table 32.

The controller 10 repeats step S11 and step S12 for each of the logical addresses of all of the logical blocks included in the physical stripe read in step S10 (step S13). Then, after processing each of the logical addresses of all of the logical blocks included in the physical stripe read in step S10 (YES in step S13), the controller 10 increments i by one (step S14). If logical address i is ineffective (NO in step S8), or if the logical block with logical address i has been written into the disk array 20 (YES in step S9), the controller 10 proceeds to step S14 without doing anything, where it increments i by one.

After incrementing i by one, the controller 10 determines whether all of the logical addresses have been processed, from the value of i after the increment (step s15). If any unprocessed logical address is left (NO in step S15), the controller 10 executes the processes in step S8 and later for logical address i specified by i after the increment in step S14. In contrast, if all of the logical addresses i have been processed (YES in step S15), the controller 10 ends the storage capacity expanding process.

As described above, in the embodiment, all of the effective logical addresses i used by the host computer 2 are retrieved, using the copy 35 of the address translation table. Then, the data in the retrieved effective logical addresses is written consecutively in empty stripes in the disk array 20 after the expansion of the storage capacity. In the embodiment, it is from step S1 to step S7 that a write request made by the host computer 2 must be stopped because of the storage capacity expanding process. However, the number of inputs and outputs to and from the disk array 20 taking place between step S1 to step S7 is only once in step S2, where the data already accumulated in the write buffer 31 at the time of the start of storage capacity expansion is written into the disk array 20. Besides that, all of the writing operations are carried out on the nonvolatile memory 30. Therefore, the time during which the execution of the write request made by the host computer 2 must be stopped is very short. In addition, the processes in step S7 and later can be carried out, even if they are mixed with the input and output requests made by the host computer 2. Therefore, in the embodiment, it is possible to expand the storage capacity of the disk array 20 without stopping the system, that is, expand the storage capacity of the disk array 20 dynamically. Moreover, in the embodiment, only the data in the logical addresses effective in the address translation table 32 at the time of the start of storage capacity expansion is to be moved (or relocated) in the disk array 20. As a result, the physical stripes which included the logical blocks with effective logical addresses at the time of the start of storage capacity expansion do not include the logical blocks with effective logical addresses at the time when the storage capacity expanding process is completed. That is, the physical stripes which included the logical blocks with effective logical addresses at the time of storage capacity expansion become empty at the time when the storage capacity expanding process is completed. Therefore, there is no need to do segment cleaning after the storage capacity expanding process. Segment cleaning will be explained later.

[First Modification]

A first modification of the embodiment will be explained by reference to the flowcharts of FIGS. 6A and 6B. The first modification is characterized by expanding the storage capacity, while writing the corresponding data in the order of effective logical addresses into an empty area different from the area that holds the data to be updated on the disk array 20. In the first modification, using the copy 35 of the address translation table generated in step S4, the controller 10 generates a new address translation table (hereinafter, referred to as sorted address translation table) 36 on the nonvolatile memory 30. The table 36 store entry information in the ascending order of effective addresses. A well-known high-speed sort algorithm, such as "merge-sort," "quick-sort," "shell-sort," or "heap-sort" may be applied to the sorting. When the i-th entry of the address translation table 32 is caused to correspond to logical address i, the individual entries in the table 32 are in the ascending order of logical addresses. In this case, since the copy 35 of the address translation table 32 can be used directly as the sorted address translation table 36, a special sort algorithm is not necessary.

Figure 6A:
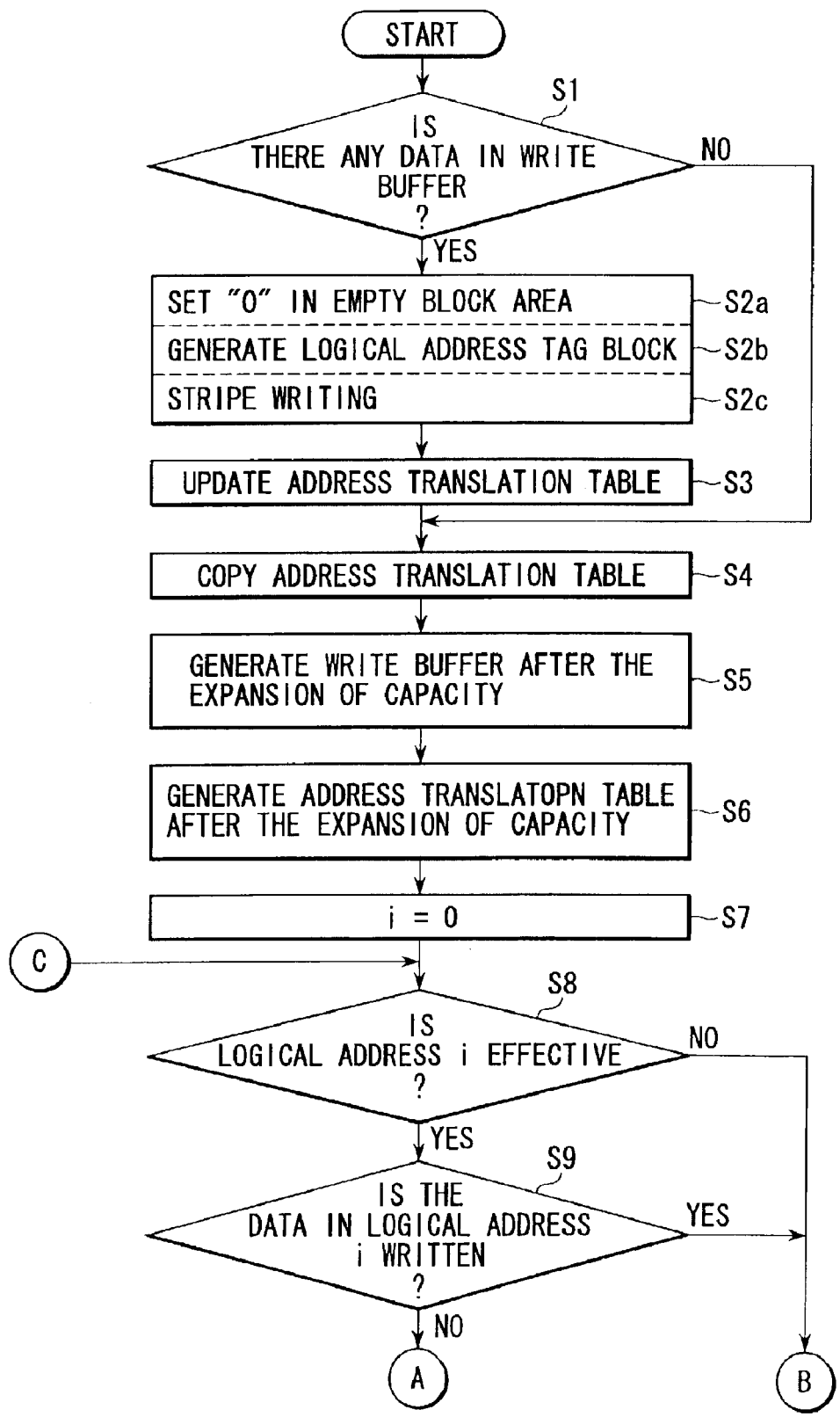
FIGS. 6A and 6B are flowcharts to help explain the process of expanding the storage capacity of the disk array 20 in the embodiment.
Figure 6B:
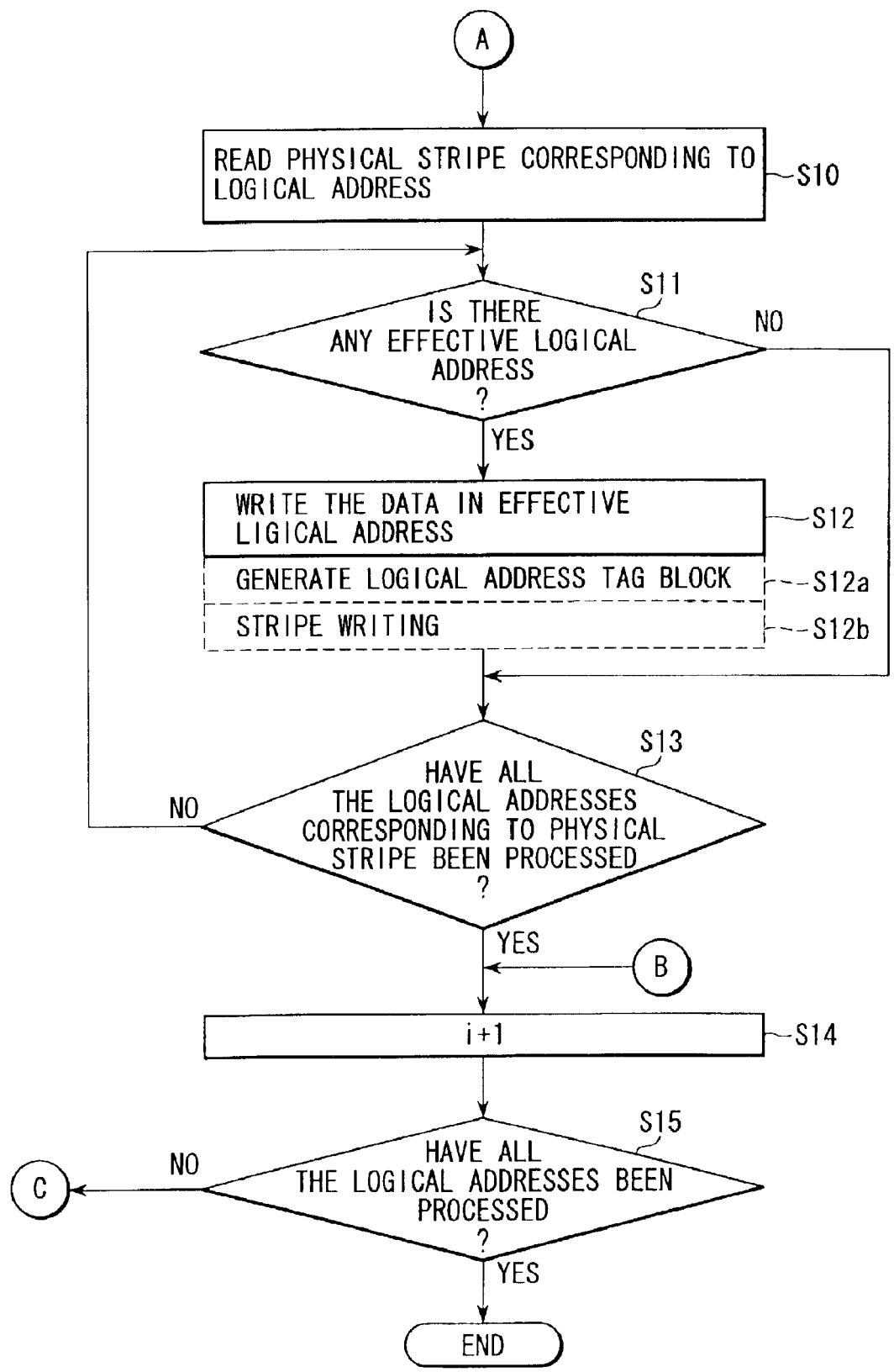

After the sorted address translation table 36 is generated, the controller 10 carries out the processes by reference to the table 36, starting with step S7 in the flowchart of FIG. 6A. This causes the storage capacity of the disk array 20 to be expanded, while writing the corresponding data into an empty area different from the area that holds the data to be updated on the disk array 20. The processing done in the order of effective logical addresses prevents ineffective data blocks (that is, fragmented data blocks) from existing in effective physical stripes. That is, it is possible to avoid fragmentation in the stripes. As a result, it is possible to prevent a decrease in the performance of sequential access due to the storage capacity expanding process. In contrast, in a conventional storage capacity expanding process, the performance of sequential access lowers, because no consideration is given to the optimization of the mapping relationship between the logical addresses and the physical addresses after the storage capacity expansion.

[Second Modification]

A second modification of the embodiment of the present invention will be explained. It is assumed that, in the second modification, a redundant disk configuration of RAID level 5 is applied to the disk array 20. A disk drive in which parity data (parity stripe segments) in a physical stripe is placed is not fixed and is switched to another cyclically for each physical stripe. In this respect, the second modification differs from the case where the redundant disk configuration of RAID level 4 assumed for convenience's sake is used in the embodiment. Furthermore, in the second modification, a disk drive in which a logical address tag block TG is placed is switched to another cyclically for each physical stripe as with the parity data.

The outline of the second modification of the embodiment of the invention will be explained. In the second modification, the recorded location of the parity data immediately after the expansion of the storage capacity is a location in the same disk array 20 before the expansion of the storage capacity. That is, in the storage capacity expanding process in the second modification, the data including parity data is not moved (or relocated). Thus, immediately after the expansion of the storage capacity, the parity data remains placed in any one of the disk drives 21 to 23 constituting the disk array 20 before the addition of the disk drive 24. Thereafter, using as a trigger the writing of the data into the disk array 20 according to a write request made by the host computer 2, new parity data is stored in each of the physical stripes expanded by the addition of the disk drive 24. The parity location in a physical stripe in which the parity data is placed is determined by the number of the physical stripe and the number of disk drives constituting the disk array 20 after the addition of a disk drive. When the new parity data is generated, a new logical address tag block TG including time stamp information TG whose stripe generation number is updated (+1) is generated. The generated logical address tag block TG, together with the parity data and the data in the logical blocks which, together with the block TG, constitute the same stripe, are written into disk array 20 simultaneously. The generation number included in the time stamp information TS in the logical address tag block TG written into the disk array 20 remains unchanged until the storage capacity is expanded again. In the second modification, it is not necessary to move the data recorded in the disk drives 21 to 23 constituting the disk array 20 before the expansion of the storage capacity and regenerate parity data. Therefore, it is possible to shorten remarkably the time required to expand the storage capacity.

Figure 7:
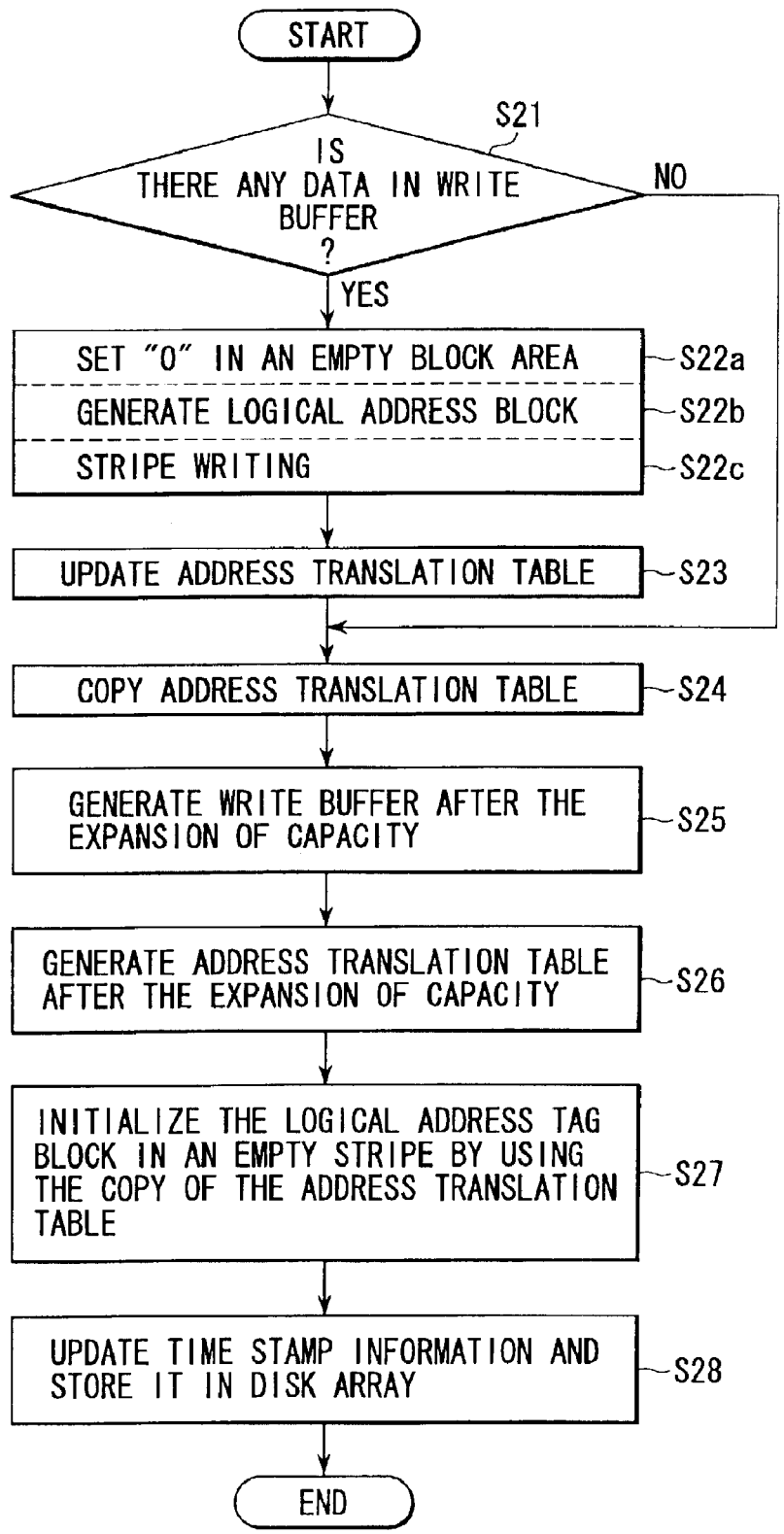
FIG. 7 is a flowchart to help explain a storage capacity expanding process applied to a second modification of the embodiment.

Next, the details of the storage capacity expanding process in the second modification will be explained by reference to a flowchart in FIG. 7. It is assumed that the host computer 2 requests a storage capacity expanding process from the controller 10. Then, the controller 10 checks the buffer management table 34 to see if there is any data accumulated in the write buffer 31 (step S21). If there is some data accumulated in the write buffer 31 (YES in step S21), the controller 10 proceeds to step S22a. In step S22a, the controller 10 sets "0" in an empty block area in the write buffer 31 as in step S2a. The process of setting "0" is unnecessary, if there is no empty block area in the write buffer 31. Next, the controller 10 generates a logical address tag block TG as in step S2b (step S22b). Then, as in step S2c, the controller 10 writes one stripe of data, including the generated logical address tag block TG, of the size before the expansion of the storage capacity simultaneously into empty areas of the disk drives 21 to 23 in the disk array 20 (step S22c).

Next, as writing the data into the disk drives 21 to 23 in step S22c, the controller 10 updates the address translation table 32 on the nonvolatile memory 30 (step S23). If having executed step S23 or if having determined in step S21 that there is no data accumulated in the write buffer 31, the controller 10 generates a copy 35 of the address translation table on the nonvolatile memory 30 as in step S4 (step S24). Next, the controller 10 changes the write buffer 31 on the nonvolatile memory 30 so that the write buffer 31 may have a size corresponding to the stripe size after the expansion of the storage capacity (step S25). That is, the controller 10 restructures the write buffer 31 so that the buffer 31 may have a size corresponding to the stripe size after the expansion of the storage capacity. Furthermore, the controller 10 restructures the address translation table 32 so that the table 32 may operate properly after the expansion of the storage capacity.

Next, using the copy 35 of the address translation table generated in step S24, the controller 10 searches for an empty stripe in the disk array 20 and initializes the logical address tag block TG in the empty stripe with NULL (here, "0") (step S27). The location of the logical address tag block TG in the empty stripe is determined by a striping rule after the expansion of the storage capacity. Next, the controller 10 updates the time stamp information 33 on the nonvolatile memory 30 and records the updated time stamp information 33 in a special empty area secured in the disk array 20 (step S28). This completes the storage capacity expanding process. The update of the time stamp information 33 is realized by incrementing each of the time stamp, stripe generation number, and the number of disk drives included in the time stamp information 33 by one. The special empty area is an area secured in the disk array 20 separately from the area in which data is to be recorded. The special empty area is used for management by the controller 10. The time stamp information (or the time stamp information in expanding the storage capacity) recorded in the disk array 20 in step 28 in completing the storage capacity expanding process is needed when it is determined whether data has been written into the added disk drive 24 after the expansion of the storage capacity.

Figure 8A:
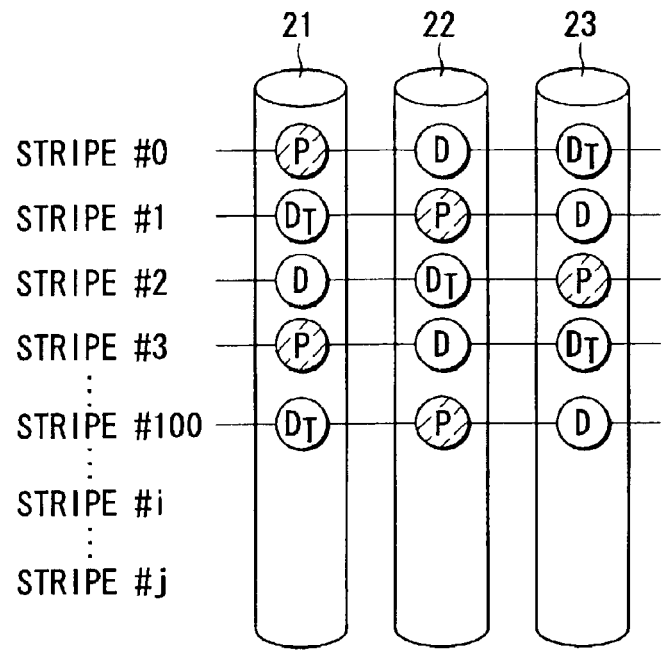
FIGS. 8A and 8B show a state where the recorded positions of the parity block and the logical address block before the expansion of the storage capacity differ from those after the storage capacity is expanded and the expanded physical stripe is written into.
Figure 8B:
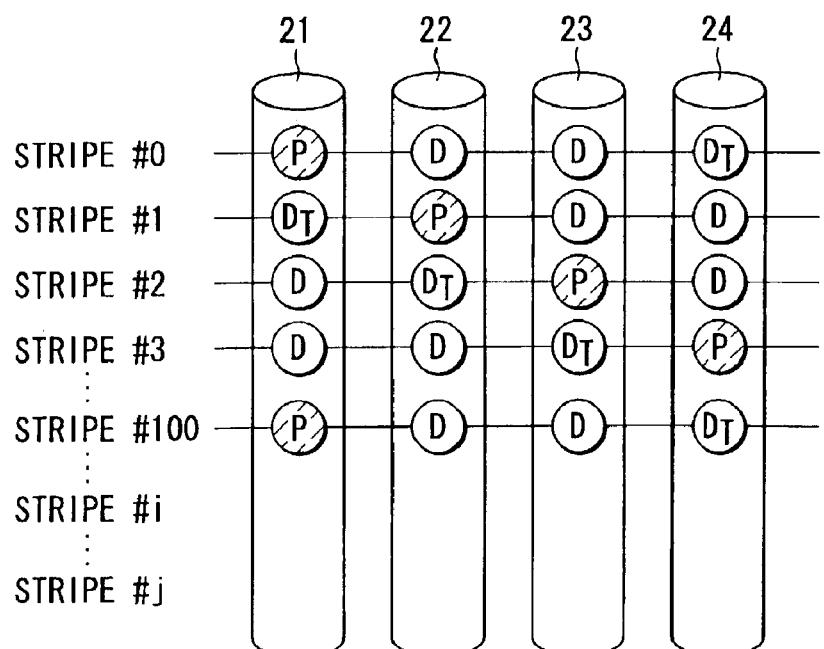

In the second modification, a redundant disk configuration of RAID level 5 is applied to the disk array 20. In a RAID level where parity blocks are distributed to a plurality of disk drives constituting the disk array 20, such as RAID level 5, the recorded locations of the parity blocks and logical address tag blocks TG before the expansion of the storage capacity differ from those after the expansion of the storage capacity and the writing of data into the expanded physical stripe. FIG. 8A shows a state where the disk array 24 has not been added yet. FIG. 8B shows a state where the disk drive 24 has been added and data has been written into the expanded physical stripe. In FIGS. 8A and 8B, for example, the positions of parity block P and logical address tag block (data block including a logical address tag block) DT in physical stripe #100 are changed in such a manner that parity block P moves from the disk drive 22 to the disk drive 21 and logical address DT moves from the disk drive 21 to the disk drive 24. The changed positions of the parity block P and logical address tag block DT can be calculated from the number of disk drives constituting the disk array 20 and the number of the physical stripe (or physical stripe number).

In the example of FIGS. 8A and 8B, the number of disk drives constituting the disk array 20 is three, disk drives 21, 22, and 23, before the expansion of the storage capacity. In this case, when the physical stripe number #i is divided by 3, the number of disk drives, if the remainder is 0, 1, or 2, the parity block in the physical stripe #i (the physical stripe with the physical stripe number #i) is placed in the disk drive 21, 22, or 23. If the remainder is 0, 1, or 2, the logical address tag block (the data block including the logical address tag block) in the physical stripe #i is placed in the disk drive 23, 21, or 22. On the other hand, after the expansion of the storage capacity, the number of disk drives constituting the disk array 20 is 4, the disk drives 21, 22, 23, and 24. In this case, when the physical stripe number #i is divided by 4, the number of disk drives, if the remainder is 0, 1, 2, or 3, the parity block in the physical stripe #i is placed in the disk drive 21, 22, 23, or 24. In addition, the logical address tag block in the physical stripe #i is placed in the disk drive 24, 21, 22, or 23. Such arrangement is called right symmetrical arrangement.

To determine whether the parity block recorded in the physical stripe is effective or not, the following two processes are needed in particular: one is the process of reading the logical address tag block TG in the physical stripe and the other is a comparing process. The time stamp included in the time stamp information TS in the read-in logical address tag block TG is called a first time stamp. The time stamp included in the time stamp information (the time stamp information at the time of the expansion of the storage capacity) recorded in a special empty area on the disk array 20 in completing the storage capacity expanding process is called a second time stamp. In the comparing process, the first and second time stamps are compared. In the second modification of the embodiment, the value of the time stamp included in the time stamp information 33 on the nonvolatile memory 30 is incremented not only at the time when data is written simultaneously in stripes but also in the processing step (step S28) in completing the storage capacity expanding process. Therefore, if the time stamp at a certain point in time is T1 and the time stamp at a point in time later than T1 and updated at least once after T1 is T2, T1 and T2 meet the expression T1<T2.

Therefore, when the value of the first time stamp is smaller than the value of the second time stamp, it is determined that the physical stripe including the first time stamp has been used before the expansion of the storage capacity. When the time stamp information TS in the logical address tag block TG is NULL, it is determined that the physical stripe including the tag block TG was unused (or an empty stripe) at the time of the expansion of the storage capacity and the state continues up to now. In addition, when the value of the first time stamp is equal or larger than the value of the second time stamp, it is determined that the physical stripe including the first time stamp was used after the expansion of the storage capacity. Furthermore, the storage capacity expanding process may be carried out a plurality of times. In this case, checking the generation number included in the time stamp information TS in the logical address tag block TG makes it possible to determine in what number of the order of storage capacity expansions the physical stripe including the tag block TG was used. This will be described in a third modification of the embodiment of the invention later.

Therefore, in theory, the parity block or logical address tag block TG to be read can be detected by carrying out the following process each time it is necessary to read out the parity block or logical address block TG. The process is to check each physical stripe on the disk array 20 to see if it is a stripe used before the expansion of the storage capacity or a stripe used after the expansion of the storage capacity. However, when the parity block or logical address tag block have to be read frequently, using this method requires a lot of time to read blocks. Therefore, this method is not practical.

To overcome the drawback, a stripe table 41 explained below should be generated and used, only when the data in the parity block or logical address tag block TG is needed. It is when the disk array configuration is restructured or when an address translation table explained layer is restructured that the data in the parity block or the logical address tag block TG is needed. The stripe table 41 is generated by checking all of the physical stripes on the disk array 20 for logical address tag blocks TG. The generated stripe table 41 is placed on the nonvolatile memory 30 as shown in FIG. 1.

FIG. 9 shows an example of the data structure of the stripe table 41. In the example of FIG. 9, each entry of the stripe table 41, a pair of physical stripe number ST# and time stamp TS# is set. Physical stripe number ST# represents the physical stripe read from the disk array 20. The physical stripe includes a logical address tag block TG. The tag block TG includes a time stamp. The time stamp is paired with the physical stripe number ST# of the corresponding physical stripe, thereby forming time stamp TS#. The time stamp TS# is set in an entry of the stripe table 41. Thus, checking each physical stripe on the disk array 20 for a logical address tag block TG once makes it possible to generate a stripe table 41. Thereafter, use of the stripe table 41 makes it possible to determine whether each physical stripe on the disk array 20 is a stripe used before or after the expansion of the storage capacity. The determination is made by just comparing the value of time stamp TS# set together with physical stripe number ST# in each entry of the stripe table 41 with the value of the time stamp included in the time stamp information 33.

When the stripe table 41 is generated, logical address tag blocks TG (physical stripes) should be selected in such a manner that the inputs and outputs to read the logical address tag blocks TG can be executed in parallel in the individual disk drives. Selecting the blocks TG this way enables the stripe table 41 to be generated efficiently. To achieve this, the number of disk drives constituting the disk array 20 and the RAID level to be used should be taken into account. For example, in the disk array 20 after the expansion of the storage capacity shown in FIG. 8B, the logical address tag blocks included in physical stripes #0, #1, #2, and #3 are placed in the different disk drives 24, 21, 22, and 23, respectively, in a distributed manner. This makes it possible to read the respective logical address tag blocks included in the physical stripes #0, #1, #2, and #3 simultaneously.

The stripe table 41 is not necessarily placed on the volatile memory 40. For example, the stripe table 41 may be placed on the nonvolatile memory 30. Moreover, the stripe table 41 may be applied to such a configuration as provides the stripe table 41 on either the volatile memory 40 or the nonvolatile memory 30 when structuring the disk array 20. This configuration is suitable for a case where either the volatile memory 40 or the nonvolatile memory 30 has room in the storage capacity. The initial value of every entry of the stripe table 41 is NULL. Therefore, when data is written simultaneously in stripes, the stripe table 41 is updated on the basis of the physical stripe number of the physical stripe to be written into and the value of the time stamp included in the time stamp information 33 on the nonvolatile memory 30. Furthermore, when the stripe table 41 is placed on the volatile memory 40 as in the example of FIG. 1, the stripe table 41 is generated by the aforementioned stripe table generating method each time the system is started.

In the second modification of the embodiment, it is from step S21 and step S28 that the request made by the host computer 2 has to be stopped according to the storage capacity expanding process. However, the inputs and outputs to and from the disk array 20 occurring during the time between step S21 and step S28 are only those related to the writing of the data accumulated in the write buffer 31 at the time of the start of storage capacity expansion into the disk array 20 and to the writing of time stamp information TS. The writing of time stamp information TS is to initialize the time stamp information TS included in the logical address tag block TG in an empty stripe. The storage capacity of the disk array 20 is expanded mostly when the empty storage capacity of the disk array 20 is running short, or when empty stripes are getting fewer on the disk array 20. Therefore, in the second modification of the embodiment, most processes are carried out on the nonvolatile memory 30. As a result, the number of inputs and outputs to and from the disk array 20 is minimized, which makes the time required to expand the storage capacity very short.

Here, a write operation in the disk array apparatus 1 after the expansion of the storage capacity in the second modification will be explained briefly. First, when the controller 10 in the disk array apparatus 1 receives a data write request from the host computer 2 after the expansion of the storage capacity, the controller 10 stores the write data (update data) specified by the host computer 2 into the write buffer 31 restructured in step S25. It is assumed that as much data including logical address tag blocks TG as is determined by the striping rule after the expansion of the storage capacity has been accumulated in the write buffer 31. Then, the controller 10 writes the data accumulated in the write buffer 31 at that time and one stripe of data including parity data simultaneously into an empty area different from the area that holds the data to be updated on the disk array 20. At this time, the controller 10 updates the address translation table 32 after the expansion of the storage capacity generated in step S26.

As described above, a write operation in the disk array apparatus 1 after the expansion of the storage capacity in the second modification is carried out as in the embodiment. The second modification, however, differs from the embodiment in the following point. In the embodiment, the data in the effective addresses is moved (or relocated) according to the striping rule after the expansion of the storage capacity in the storage capacity expanding process. Therefore, in the embodiment, all of the effective physical stripes in the disk array 20 after the completion of the storage capacity expansion are all effective physical stripes after the expansion of the storage capacity. The effective physical stripes after the expansion of the storage capacity are effective stripes which have been written into in stripes according to the striping rule after the expansion of the storage capacity. In the effective physical stripes after the expansion of the storage capacity, one stripe of data in which a logical address tag block TG and parity data are arranged according to the striping rule after the expansion of the storage capacity is stored. In contrast, in the second modification, the data is not moved (or relocated) in the storage capacity expanding process. Therefore, in the second modification, there is a possibility that physical stripes before the expansion of the storage capacity and effective physical stripes after the expansion of the storage capacity will mix together on the disk array 20 after the expansion of the storage capacity. In this point, the second modification differs from the embodiment. The effective physical stripes before the expansion of the storage capacity are the effective physical stripes which have been written into in stripes according to the striping rule before the expansion of the storage capacity.

Obviously, in the second modification, as time passes after the expansion of the storage capacity, the percentage of effective physical stripes after the expansion of the storage capacity increases. This means that there is no problem even when the process of expanding the storage capacity of the disk array 20 without moving the data on the disk array 20 in the second modification. In the second modification, however, effective physical stripes before the expansion of the storage capacity mix with physical stripes after the expansion of the storage capacity. Therefore, to extract the logical address tag block TG and parity block from a physical stripe in the second modification, the following determining process is needed, depending on the RAID level applied to the disk array 20. That is, in the determining process, to determine the striping rule applied to the physical stripe, it is determined whether the physical stripe is an effective physical stripe before the expansion of the storage capacity or an effective stripe after the expansion of the storage capacity. This will be explained later.

Next, a read operation in the disk array apparatus 1 after the expansion of the storage capacity will be explained briefly. First, according to the read request made by the host computer 2, the controller 10 receives the logical address (or logical block address) of the starting position of the data to be read and information about the size. From the received start logical address and size, the controller 10 determines the logical addresses of as many logical blocks as the number of blocks specified by the size, including the start logical address. On the basis of each of the determined logical addresses, the controller 10 refers to the corresponding entry of the address translation table 32. This enables the controller 10 to translate each logical address (or logical block address) into a physical address (or physical block address) composed of a physical stripe number and a physical block number. The address translation table 32 referred to is the address translation table after the expansion of the storage capacity restructured on the nonvolatile memory 30.

Using the physical address after the translation, the controller 10 reads the data in the physical block specified by the physical address from the disk array 20. The read data is transferred to the host computer 2. Here, the physical stripe including the physical block to be read from the disk array 20 is either a physical stripe before the expansion of the storage capacity or a physical stripe after the expansion of the storage capacity. However, when the physical block is read, there is no need to know whether the physical block is a physical stripe either before or after the expansion of the storage capacity. Obviously, if the physical block specified by the physical address after the address translation is included in a physical stripe before the expansion of the storage capacity, the information in the entry of the address translation table 32 used for the address translation has been set before the expansion of the storage capacity. In contrast, if the physical block specified by the physical address after the address translation is included in a physical stripe after the expansion of the storage capacity, the information in the entry of the address translation table 32 used for the address translation has been set after the expansion of the storage capacity. In the disk array apparatus 1, there is generally provided a data cache used to hold temporarily the data exchanged between the host computer 2 and disk array apparatus 1. Therefore, when the data to be read according to the request made by the host computer 2 is present on the data cache, the data on the cache is read out and transferred to the host computer 2.

FIG. 10 shows an example of the address translation table 32 after the expansion of the storage capacity in the second modification. In FIG. 10, for example, time stamp values other than NULL are set in the entries corresponding to logical addresses L0 and L1. This means that the physical stripe numbers and physical block numbers corresponding to logical addresses L0 and L1 are stored in the address translation table (or the copy 35 of the address translation table) before the expansion of the storage capacity recorded in the nonvolatile memory 30. In addition, this means that the logical blocks with logical addresses L2 and Li are recorded in the block areas whose physical block numbers are 14 and 2 in the physical stripes whose physical stripe numbers are 7000 and 10000. Logical address Lj means an ineffective logical address.

When the second modification is applied to the expansion of the storage capacity of the disk array 20 using RAID level 5, the position of the parity block in a stripe where no writing has been done after the expansion of the storage capacity differs from that in a stripe where writing has been done after the expansion of storage capacity. As described earlier, the position of the parity block can be calculated easily from the physical stripe number and the number of disk drives constituting the disk array. For example, as shown in FIG. 2, it is assumed that the disk array 20 before the expansion of the storage capacity is composed of the disk drives 21 to 23. Moreover, it is assumed that the disk array 20 is used in RAID level 5 where parity data is arranged in a right symmetrical manner. In this case, for example, the parity block whose physical stripe number 100 is placed in the second one 22 of the disk drives 21 to 23, since 100/3 has a remainder of 1 (see FIG. 8A). Next, as shown in FIG. 5, it is assumed that the disk array 20 after the expansion of the storage capacity is composed of the disk drives 21 to 24 including the added disk drive 24. In addition, the disk array 20 after the expansion of the storage capacity is used in RAID level 5 where parity data is arranged in a right symmetrical manner as before the expansion of the storage capacity. Moreover, for example, it is assumed that the physical stripe whose physical stripe number is 100 is written in stripes. In this case, the parity block in the physical stripe whose physical stripe number 100 is placed in the first one 21 of the disk drives 21 to 24, since 100/4 has a remainder of 0 (see FIG. 8B).

As described above, the position of the parity block placed in each physical stripe in the disk array 20 before the expansion of the storage capacity differs from that after the expansion of the storage capacity and after the writing of data into the expanded physical stripe. To determine whether the physical stripe before or after the expansion of the storage capacity is effective, the address translation table 32 after the expansion of the storage capacity shown in FIG. 10 is used. Specifically, the address translation table 32 after the expansion of the storage capacity is searched using the physical stripe number of the physical stripe to be determined. By the search, time stamp TS# (hereinafter, referred to as a third time stamp) is taken out from the entry of the address translation table 32 in which the physical stripe number of the physical stripe to be determined has been set. Then, the third time stamp is compared with the time stamp, or the second time stamp, in the time stamp information (or time stamp information at the time of the expansion of the storage capacity) stored in a special area of the disk array 20 at the time of the expansion of the storage capacity. Here, if the value of the third time stamp is equal to or larger than the second time stamp, it is determined that the target physical stripe is an effective stripe which has been written in physical stripes after the expansion of the storage capacity. In contrast, if the value of the third time stamp is smaller than the value of the second time stamp, it is determined whether the third time stamp is non-NULL. If the third time stamp is non-NULL (or not "0"), it is determined that the target physical stripe is an effective stripe which has been written into in physical stripes before the expansion of the storage capacity. In contrast, if the third time stamp is NULL (or "0"), it is determined that the target physical stripe has been an empty stripe before the expansion of the storage capacity. Here, the position of the parity block in each of the effective physical stripes before or after the expansion of the storage capacity is calculated from the number of disk drives constituting the disk array 20 and the physical stripe number of the physical stripe before or after the expansion of the storage capacity as described earlier.

In the second modification of the embodiment of the invention, a segment cleaning process is carried out after the expansion of the storage capacity. Hereinafter, the segment cleaning process will be explained. In the embodiment, instead of the write data (or update data) requested by the host computer 2 being written directly into the old data area, the write data is accumulated in the buffer 31 in blocks. Then, when one stripe worth of logical blocks has been accumulated in the write buffer 31, one stripe worth of data blocks including the one stripe worth of logical blocks and parity block is written simultaneously into an empty area different from the old data area in the disk array 20. The simultaneous writing requires an empty area to be present at all times. When data is written into an empty area different from the old data area, the data to be updated in the old data area becomes ineffective. Therefore, effective data items in the old data area should better be gathered together to secure an empty area. This process is called a segment cleaning process. The segment cleaning process is roughly divided into ineffective block determination and stripe integration. In the ineffective determination, the time stamp (the third time stamp) recorded in the address translation table 32 after the expansion of the storage capacity is used. The time stamp included in the time stamp information 33 on the nonvolatile memory 30 at the time of recording is used as the time stamp recorded in the address translation table 32 as described earlier. The time stamp information 33 is added as part of the time stamp information TS to the logical address tag block TG when the data accumulated in the write buffer 31 is written simultaneously in stripes. As described earlier, the time stamp included in the time stamp information 33 is incremented each time the disk array 20 is written in stripes. Therefore, whether each logical block in each physical stripe to be used in stripe integration is effective or ineffective can be determined as follows. First, the time stamp (the first time stamp) in the logical address tag block TG included in each physical stripe to be used in stripe integration is compared with the time stamp (the third time stamp) set in the entry of the address translation table 32 corresponding to each logical address in the tag block TG. Then, whether the logical block is ineffective or not is determined, depending on whether the first time stamp is smaller than the third time stamp (or older than the third time stamp).

The position of the logical address tag block in the physical stripe to be used in stripe integration is not fixed in the second modification where a redundant disk configuration of RAID level 5 is applied to the disk array 20. The position of the logical address tag block depends on whether the corresponding physical stripe is an effective stripe before or after the expansion of the storage capacity. The position of the logical address tag block included in the physical stripe can be calculated easily from the corresponding physical stripe number and the number of disk drives constituting the disk array 20. That is, the position of the physical address tag block in the physical stripe can be calculated using the physical stripe number and a striping rule determined by the number of disk drives. When the position of the logical address tag block in the physical stripe before the expansion of the storage capacity is calculated, a value of 3 is used as the number of disk drives before the expansion of the storage capacity. In contrast, when the position of the logical address tag block in the physical stripe after the expansion of the storage capacity is calculated, a value of 4 is used as the number of disk drives after the expansion of the storage capacity.

In determining whether the physical stripe used in stripe integration is an effective stripe before or after the expansion of the storage capacity, the time stamp TS# (the third time stamp) in the entry of the address translation table 32 after the expansion of the storage capacity in which the physical stripe number of the physical stripe used in stripe integration has been set is used as described earlier. The third time stamp is compared with the time stamp (the second time stamp) in the time stamp information at the time of the expansion of the storage capacity to make the above determination (or the stripe determination). In the second modification, however, the stripe before the expansion of the storage capacity is used as the stripe to be used in stripe integration as described below. Since various algorithms for selecting such stripes as are used in stripe integration have been proposed and are not related directly to the present invention, explanation of them will be omitted.

Figure 11A:
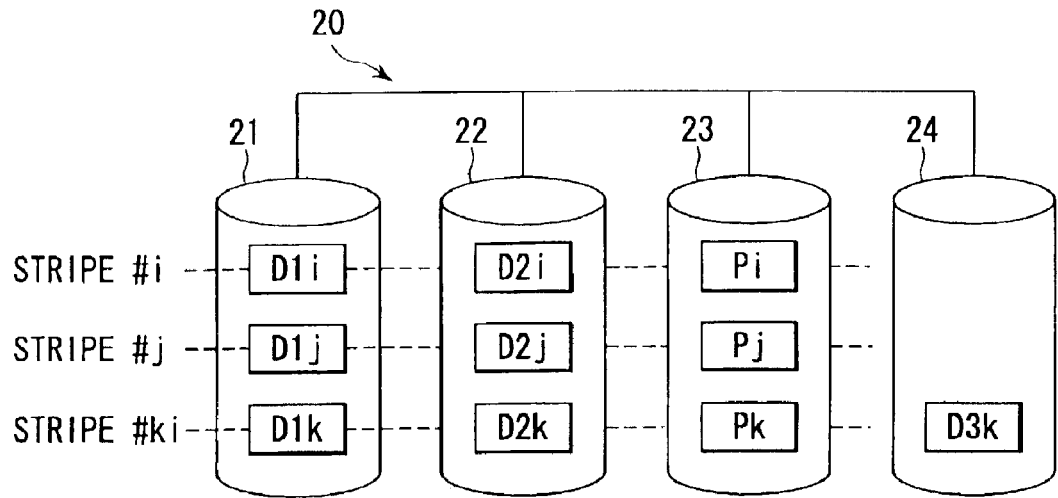
FIGS. 11A and 11B are diagrams to help explain concrete examples of a stripe integration process applied to the second modification of the embodiment.
Figure 11B:
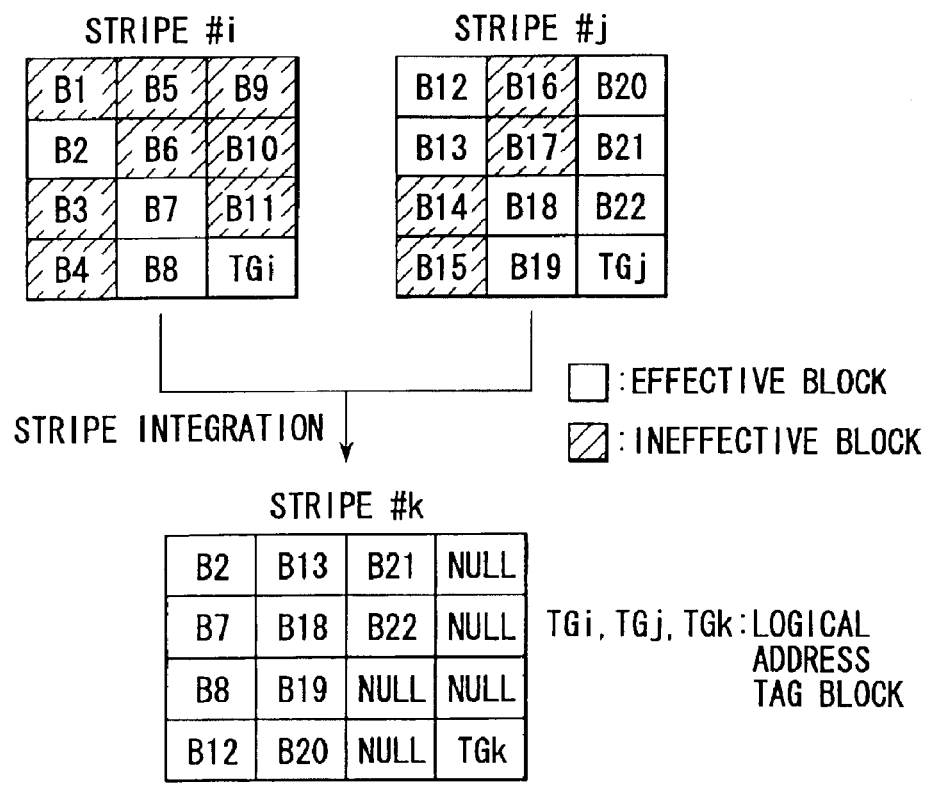

A concrete example of the stripe integration process will be explained by reference to FIGS. 11A and 11B. FIGS. 11A and 11B show an example of integrating two stripes #i and #j into one stripe #k. Both stripes #i and #j are physical stripes determined to be effective stripes before the expansion of the storage capacity in the aforementioned stripe determination. As shown in FIG. 11B, stripe #i is composed of blocks B1 to B11 and a logical address tag block TGi, and 12 blocks. It is assumed that, of the blocks B1 to B11, three blocks B2, B7, and B8 are effective and the remaining 8 blocks are ineffective. Similarly, stripe #j is composed of blocks B12 to B22 and a logical address tag block TGi, and 12 blocks. It is assumed that, of the blocks B12 to B22, seven blocks B12, B13, B18, B19, B20, B21, and B22 are effective and the remaining 4 blocks are ineffective. A description of block Bx (x=1 to 22) means a logical block whose logical address is x.

In the example of FIG. 11B, the number of effective blocks in two stripes #i and #j excluding logical address tag blocks TGi, TGj is only 10 in total. Therefore, it is possible to integrate the two stripes #i and #j into the expanded stripe #k including the effective blocks B2, B7, B8, B12, B13, B18, B19, B20, B21, and B22 included in the stripes #i and #j and the corresponding logical address tag block TGk. As a result of the stripe integration, one empty stripe is secured. In the example of FIG. 11B, the effective blocks integrated into stripe #k are arranged in this order: B2, B7, B8, B12, B13, B18, B19, B20, B21, and B22. That is, they are arranged in the order of logical addresses. As described above, when the individual effective blocks are rearranged in the ascending order of corresponding logical addresses at the time of stripe integration, this prevents the performance of sequential access from getting lower. To do this, it is preferable to select stripes #i and #j including logical blocks with consecutive effective logical addresses.

To integrate the selected two stripes #i and #j into stripe #k, the controller 10 reads the stripes #i and #j from the disk array 20. Next, the controller 10 writes only the effective blocks in stripes #i and #j closely into the write buffer 31 after the expansion of the storage capacity on the nonvolatile memory 30 (see FIG. 11B). In the example of FIGS. 11A and 11B, there are five empty block areas into which no effective block has been written on the write buffer 31. Therefore, the controller 10 sets NULL in each of the five empty block areas.

Furthermore, the controller 10 takes out all of the logical addresses of the effective blocks from the logical address tag blocks TGi and TGj in stripes #i and #j. The positions of the logical address tag blocks TGi and TGj in stripes #i and #j are determined by the physical stripe numbers of the stripes and the striping rule before the expansion of the storage capacity. Then, the controller 10 generates a new logical address tag block TGk including the taken-out logical address and time stamp information TS. The controller 10 writes the generated logical address tag block TGk into the last block area of the write buffer 31 as shown in FIG. 11B. The arrangement of logical addresses in the logical address tag block TGk coincides with the arrangement of effective blocks in stripe #k. The time stamp, generation number, and the number of disk drives in the time stamp information 33 at that time are used as the time stamp, generation number, and the number of disk drives included in the time stamp information TS. The time stamp information 33 is updated when stripe #k is written into the disk array 20. As described above, the stripe integration is the process of integrating a plurality of stripes with ineffective data blocks into at least one stripe having all of the effective data blocks included in the plurality of stripes.

Figure 12A:
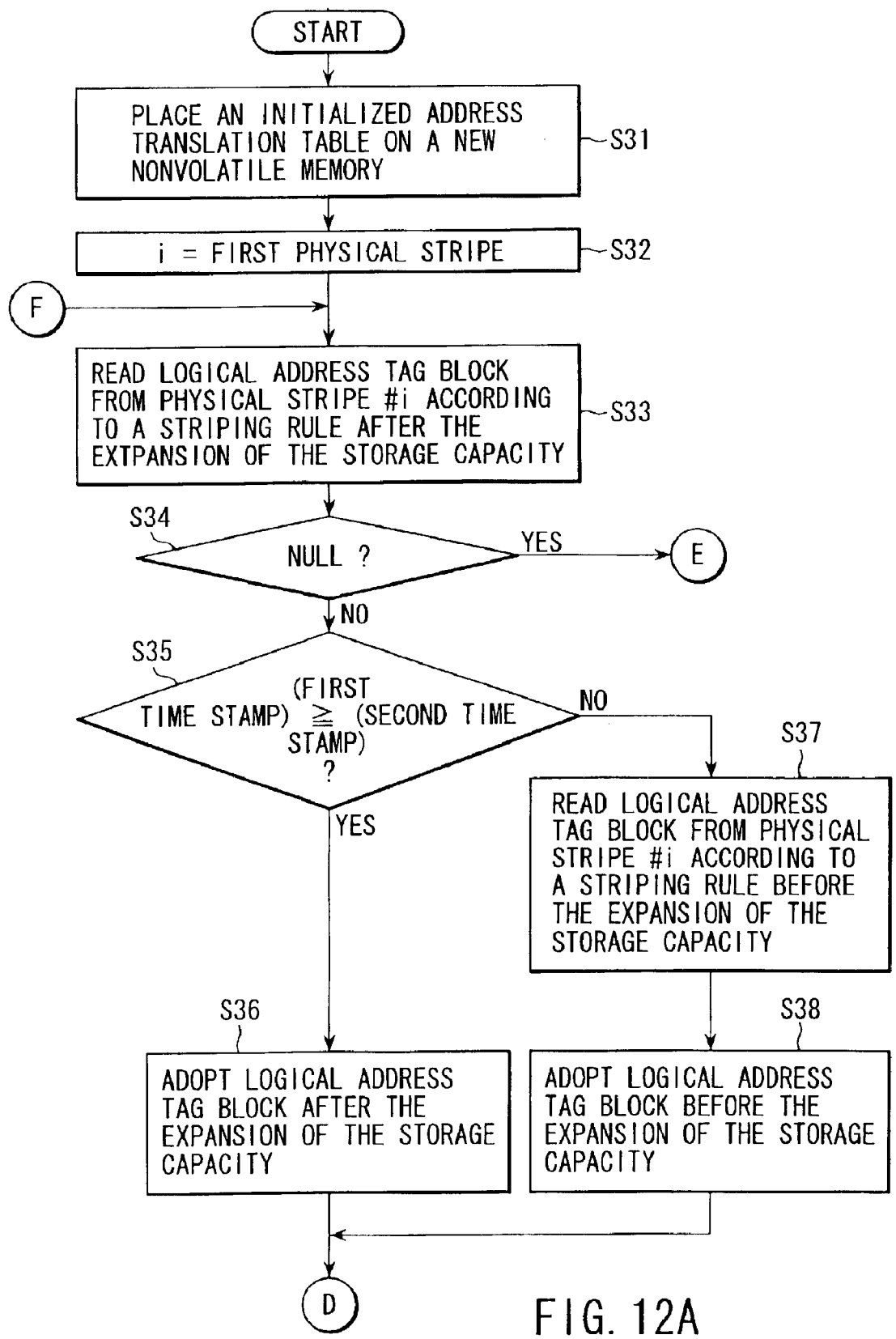
FIGS. 12A and 12B are flowcharts to help explain the process of restructuring the address translation table 32 applied to the second modification of the embodiment.
Figure 12B:
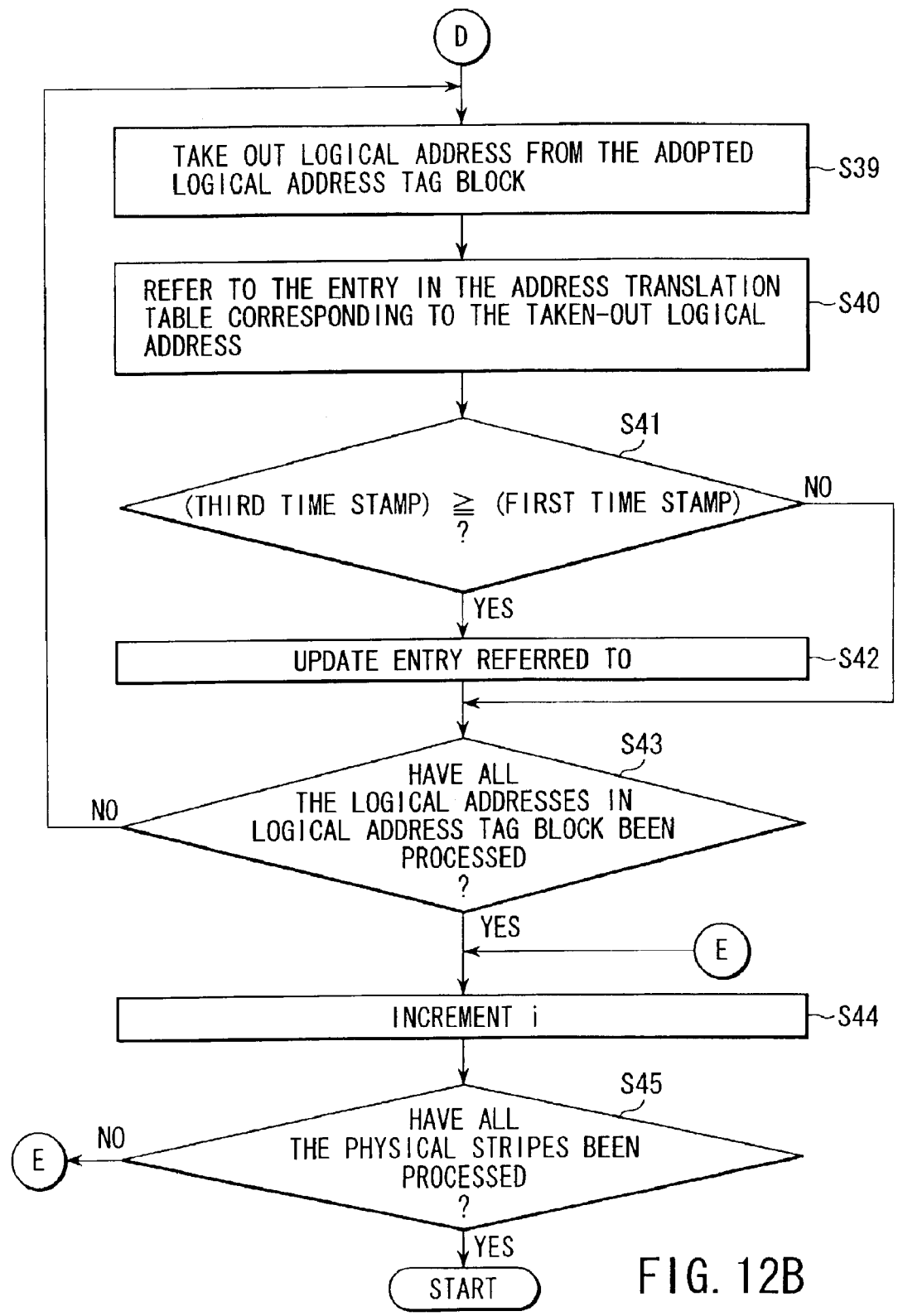

Next, the process of restructuring the address translation table 32 applied when the nonvolatile memory 30 fails in the second modification of the embodiment will be explained by reference to flowcharts in FIGS. 12A and 12B. In the embodiment, according to an input/output request made by the host computer 2 to the disk array apparatus 1, a logical address is translated into a physical address, using the address translation table 32 on the nonvolatile memory 30. The disk array 20 is accessed using the translated physical address. When the nonvolatile memory 30 has failed, however, the address translation table 32 cannot be used, so that the disk array 20 cannot be accessed. In this case, the process of restructuring the address translation table 32 is needed.

To restructure the address translation table 32, the controller 10 places the initialized address translation table 32 on a new nonvolatile memory 30 replacing the fault nonvolatile memory 30 (step S31). NULL has been set in any of the fields excluding the logical address field in each entry of the initialized address translation table 32. Furthermore, in the logical address field in each entry of the address translation table 32, a logical address has been set. In the second modification, a logical address Li corresponding to the entry i has been set in the logical address field in the entry i of the address translation table 32. Next, the controller 10 sets variable i specifying a physical stripe to an initial value indicating the first physical stripe (step S32). Then, the controller 10 carries out the process of detecting the logical address tag block TG included in physical stripe #i in the disk array 20 (steps S33 to S38). The details of the process of detecting the logical address tag block TG will be explained later.

The controller 10 takes out one unprocessed logical address from the detected logical address tag block TG (step S39). The controller 10 refers to the entry in the address translation table 32 corresponding to the taken-out logical address (step S40). Then, the controller 10 determines whether the value of time stamp TS# (the third time stamp) included in the entry referred to in the address translation table 32 is smaller than the value of the time stamp (the first time stamp) included in the time stamp information TS in the detected logical address tag block TG (step S41).

It is assumed that the value of the third time stamp is smaller than the value of the first time stamp (YES in step S41). In this case, the controller 10 determines that the address translation information set in the entry referred to is ineffective and therefore the data in the physical block represented by the information is ineffective. Then, the controller 10 updates the physical stripe number, physical block number, and time stamp in the entry referred to (step S42) and proceeds to step S43. In step S43, the controller 10 updates the physical stripe number, physical block number, and time stamp included in the entry referred to the number indicating the physical stripe to which the detected logical address tag block TG belongs, the number of the physical block to which the logical block with the logical address corresponding to the entry referred to is allocated, and the time stamp included in the time stamp information TS in the logical address tag block TG, respectively.

Next, it is assumed that the value of the third time stamp (the time stamp in the reference entry) is not smaller than the value of the first time stamp (the time stamp in the logical address tag block TG) (NO in step S41). In this case, the controller 10 determines that the data in the physical block represented by the information set in the entry referred to is effective. Then, the controller 10 proceeds to step S43 without updating the entry referred to.

In step S43, the controller 10 determines whether all of the logical addresses in the detected logical address tag block TG have been processed. If there is any unprocessed logical address left (NO in step S43), the controller 10 returns to step S39. Here, one unprocessed logical address is taken out from the detected logical address tag block TG. In contrast, if all of the logical addresses have been processed (YES in step S43), the controller 10 increments i by one (step S44). Then, the controller 10 determines from the value of the incremented i whether all of the physical stripes have been processed (step S45). If there is any unprocessed physical stripe left (NO in step S45), the controller 10 carries out the processes in step S33 and later about the physical stripe #i specified by the incremented i. In contrast, if all of the physical stripes have been processed (YES in step S45), the controller 10 ends the process of restructuring the address translation table 32.

Next, the details of the process of detecting the logical address tag block TG (steps S33 to S38) will be explained. In the disk array 20 using RAID level 5, the position of the logical address tag block TG in a physical stripe in which no writing is done after the expansion of the storage capacity may differ from that in a physical stripe in which writing is done after the expansion of the storage capacity as described earlier (see FIGS. 8A and 8B). Therefore, it is necessary to determine whether a physical stripe before or after the expansion of the storage capacity is effective. Then, to detect the logical address tag block TG from physical stripe #i, the controller 10 assumes that the physical stripe #i is the physical stripe which is written into after the expansion of the storage capacity. Then, according to the striping rule after the expansion of the storage capacity, the controller 10 reads the logical address tag block TG, starting at the position determined by the physical stripe number and the number of disk drives (in this case, 4) constituting the disk array 20 in physical stripe #i (step S33). The controller 10 determines whether the read logical address tag block is NULL (step S34).

It is assumed that the read logical address tag block is NULL (YES in step S34). In this case, the controller 10 determines that physical stripe #i remains initialized in the process in step S27 (in the NULL initialization) at the time of the expansion of the storage capacity. That is, the controller 10 determines that physical stripe #i remains an empty stripe even after the expansion of the storage capacity. Then, the controller 10 proceeds to step S44 to detect the logical address tag block TG from the next physical stripe in the disk array 20.

Next, it is assumed that the read logical address tag block TG is not NULL (NO in step S34). In this case, the controller 10 determines whether the value of the time stamp (the first time stamp) in the logical address tag block TG is equal to or larger than the value of the time stamp (second time stamp) in the time stamp information at the time of the expansion of the storage capacity (step S35). If the value of the first time stamp is equal to or larger than the second time stamp (YES in step S35), the controller 10 determines that physical stripe #i is an effective physical stripe after the expansion of the storage capacity. In this case, the controller 10 uses the logical address tag block TG read in step S33 (step S36). As a result, the logical address tag block TG is detected from effective physical stripe #i after the expansion of the storage capacity. On the other hand, if it cannot be determined that the value of the first time stamp is equal to or larger than the value of the second time stamp (NO in step S35), the controller 10 determines that the assumption is wrong. That is, the controller 10 determines that physical stripe #i is not an effective physical stripe after the expansion of the storage capacity but a physical stripe before the expansion of the storage capacity. In this case, the controller 10 reads the logical address tag block TG from physical stripe #i according to the striping rule before the expansion of the storage capacity (step S37). The position of the logical address tag block TG in physical stripe #i is determined by the physical stripe number and the number (in this case, 3) of disk drives constituting the disk array 20 before the expansion of the storage capacity. The controller 10 uses the logical address tag block TG read in step S37 (step S38). As a result, the logical address tag block TG is detected from effective physical stripe #i before the expansion of the storage capacity. The case where it cannot be determined that the value of the first time stamp is equal to or larger than the value of the second time stamp includes a case where the logical address tag block TG is indefinite.

Figure 13:
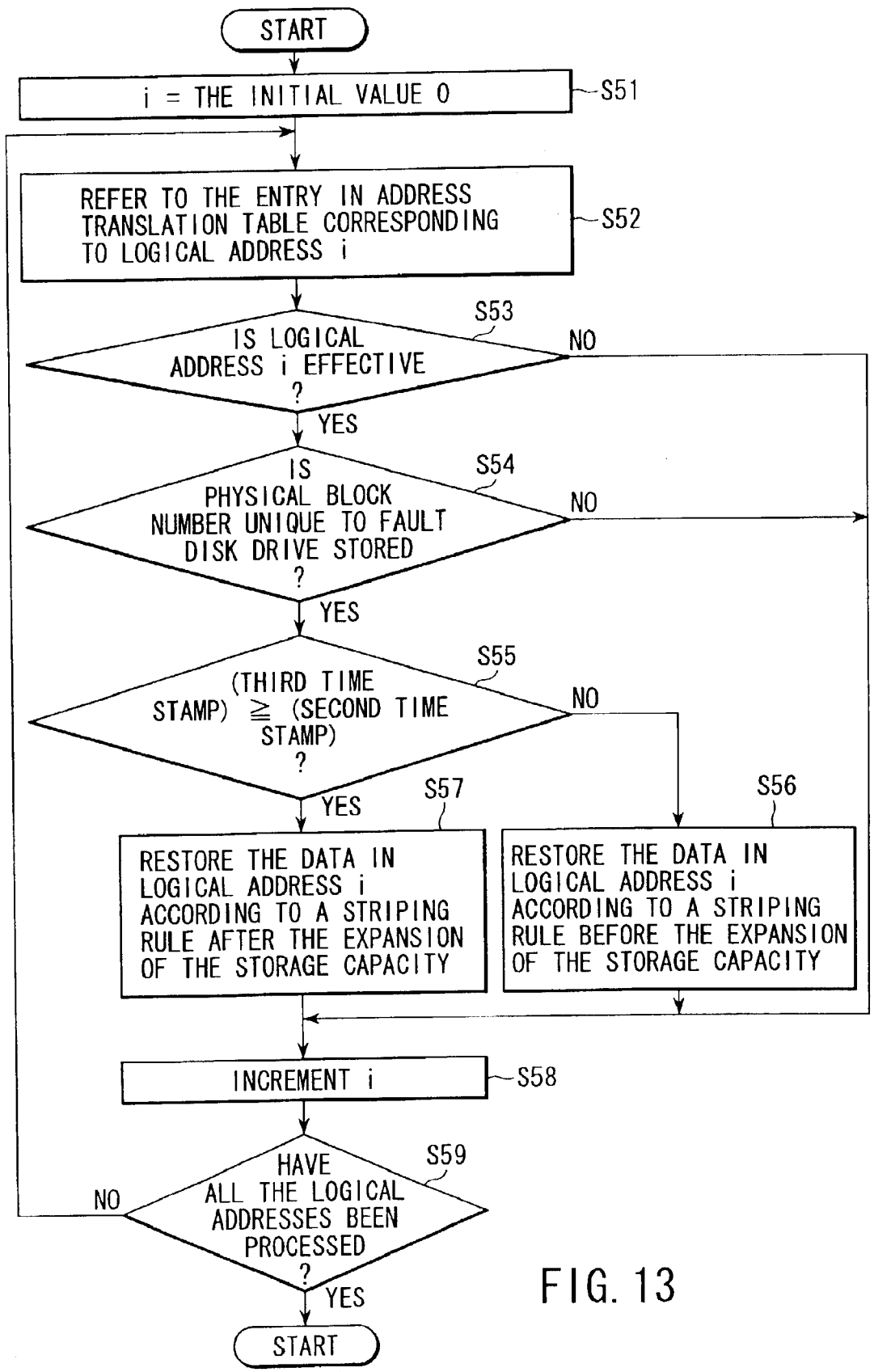
FIG. 13 is a flowchart to help explain a data restoring process applied to the second modification of the embodiment.

Next, a data restoring process after the storage capacity of the disk array 20 is expanded applied to the second modification of the embodiment will be explained by reference to a flowchart in FIG. 13. When a failure has occurred in any one of the disk drives constituting the disk array 20 after the expansion of the storage capacity of the disk array 20, the data restoring process is carried out to restore the data in the disk drive where a failure has occurred into a spare disk drive. First, the controller 10 sets variable i indicating a logical address (logical block address) to an initial value of 0 (step S51). Next, the controller 10 refers to the entry corresponding to logical address i of the address translation table 32 after the expansion of the storage capacity (step S52). On the basis of the result of referring to the entry of the address translation table 32, the controller 10 determines whether logical address i is effective (step S53). This determination is realized by checking whether all of the physical stripe number, physical block number, and time stamp in the reference entries of the address translation table 32 have values other than NULL.

If logical address i is effective (YES in step S53), that is, if effective logical address i can be retrieved, the controller 10 proceeds to step S54. In step S54, the controller 10 determines whether the physical block number included in the entry referred to is a physical block number unique to the disk drive where a failure has occurred (fault disk drive) (step S54). Here, it is assumed that a physical block number unique to the fault disk drive has been stored in the entry referred to (YES in step S54). That is, effective logical address i corresponding to the physical block number unique to the fault disk drive has been retrieved. In this case, the controller 10 determines whether the value of the time stamp TS# (third time stamp) included in the entry referred to is equal to or larger than the time stamp (second time stamp) included in the time stamp information at the time of the expansion of the storage capacity (step S55).

If the value of the third time stamp is smaller than the value of the second time stamp (NO in step S55), the controller 10 determines that the physical stripe in which the data block with logical address i exists is an effective physical stripe before the expansion of the storage capacity. In this case, the controller 10 restores the data in logical address i according to the striping rule before the expansion of the storage capacity (step S56). Specifically, for example, in a case where a failure occurs in the disk drive 20 in the disk array 20 using PAID level 4 or RAID level 5, the controller 10 restores the data by the exclusive OR of the individual data blocks on the basis of the data blocks belonging to the disk drives 22 and 23 in the effective physical stripes before the expansion of the storage capacity. The restored data is written into a spare disk drive (or replaced disk drive) used in place of the fault disk drive.

On the other hand, if the value of the third time stamp is equal to or larger than the value of the second time stamp (YES in step S55), the controller 10 determines that the physical stripe in which the data block with logical address i exists is an effective physical stripe after the expansion of the storage capacity. In this case, the controller 10 restores the data in logical address i according to the striping rule after the expansion of the storage capacity (step S57). Specifically, for example, in a case where a failure has occurred in the disk drive 21, the controller 10 restores the data by the exclusive OR of the individual data blocks on the basis of the data blocks belonging to the disk drives 22 and 24 in the effective physical stripes after the expansion of the storage capacity. The restored data is written into the replaced disk drive.

The controller 10 executes step S56 or step S57 and then increments i by one (step S58). From the value of the incremented i, the controller 10 determines whether all of the logical addresses have been processed (step S59). If there is any unprocessed logical address left (NO in step S59), the controller 10 carries out the processes in step S52 and later about the logical address i specified by the incremented i in step S58. In contrast, if all of the logical addresses have been processed (YES in step S59), the controller 10 ends the process of restoring the data in the fault disk drive. This completes the restructuring of the disk array 20.

As described above, in the second modification of the embodiment, when a failure has occurred in any one of the disk drives constituting the disk array 20, only the effective logical addresses used by the host computer 2 and allocated to the physical blocks existing on the fault disk drive are all retrieved from the address translation table 32. Then, only the data in the retrieved logical addresses are restored. This enables the restoring process to be carried out in a short time.

To restore the data in the retrieved logical addresses, it is necessary to determine whether the physical stripe in which the data blocks with the logical addresses exist is a physical stripe before the expansion of the storage capacity or a physical stripe after the expansion of the storage capacity. In the second modification, the determination is made by comparing the time stamp (third time stamp) in the entry of the address translation table 32 corresponding to the target logical address with the time stamp (second time stamp) in the time stamp information at the time of the expansion of the storage capacity. This enables the determination to be made correctly.

The restored data may not be written into a physical block in the replaced disk drive corresponding to the physical block in the fault disk drive in which the data was stored. For example, the configuration may be such that only the data in the effective logical addresses including the restored data is written in stripes into the disk array 20 where the fault disk drive has been replaced with the replace disk drive. It goes without saying that writing in stripes is effected, while accumulating data in the write buffer 31 after the expansion of the storage capacity. That is, the controller 10 uses the address translation table 32 after the expansion of the storage capacity, thereby reading only the data in the logical blocks corresponding to the effective addresses from the disk array 20. The controller 10 writes the data in the logical blocks read from the disk array 20 sequentially into the write buffer 31 after the expansion of the storage capacity. Then, the controller 10 generates a logical address tag block and a parity block each time one stripe worth of logical blocks of data accumulate in the write buffer 31. The controller 10 writes one stripe worth of data blocks composed of one stripe worth of logical blocks of data accumulated in the write buffer 31 and the generated logical address tag block and parity block into the disk array 20 according to the striping rule after the expansion of the storage capacity. This makes it possible to restructure the RAID configuration and simultaneously do segment cleaning.

When the RAID configuration is restructured, the effective logical addresses should be rearranged in ascending order as in the first modification of the embodiment. In this case, the data in the logical addresses is accumulated in the write buffer 31 after the expansion of the storage capacity in the order of effective logical addresses. Then, each time one stripe worth of logical blocks of data accumulates in the write buffer 31, one stripe of data including the one stripe worth of logical blocks is written into the disk array 20. This assures the continuity of logical addresses after the restructuring of the RAID configuration and enables sequential reading to be done efficiently by the host computer 2.

[Third Modification]

Figure 14:
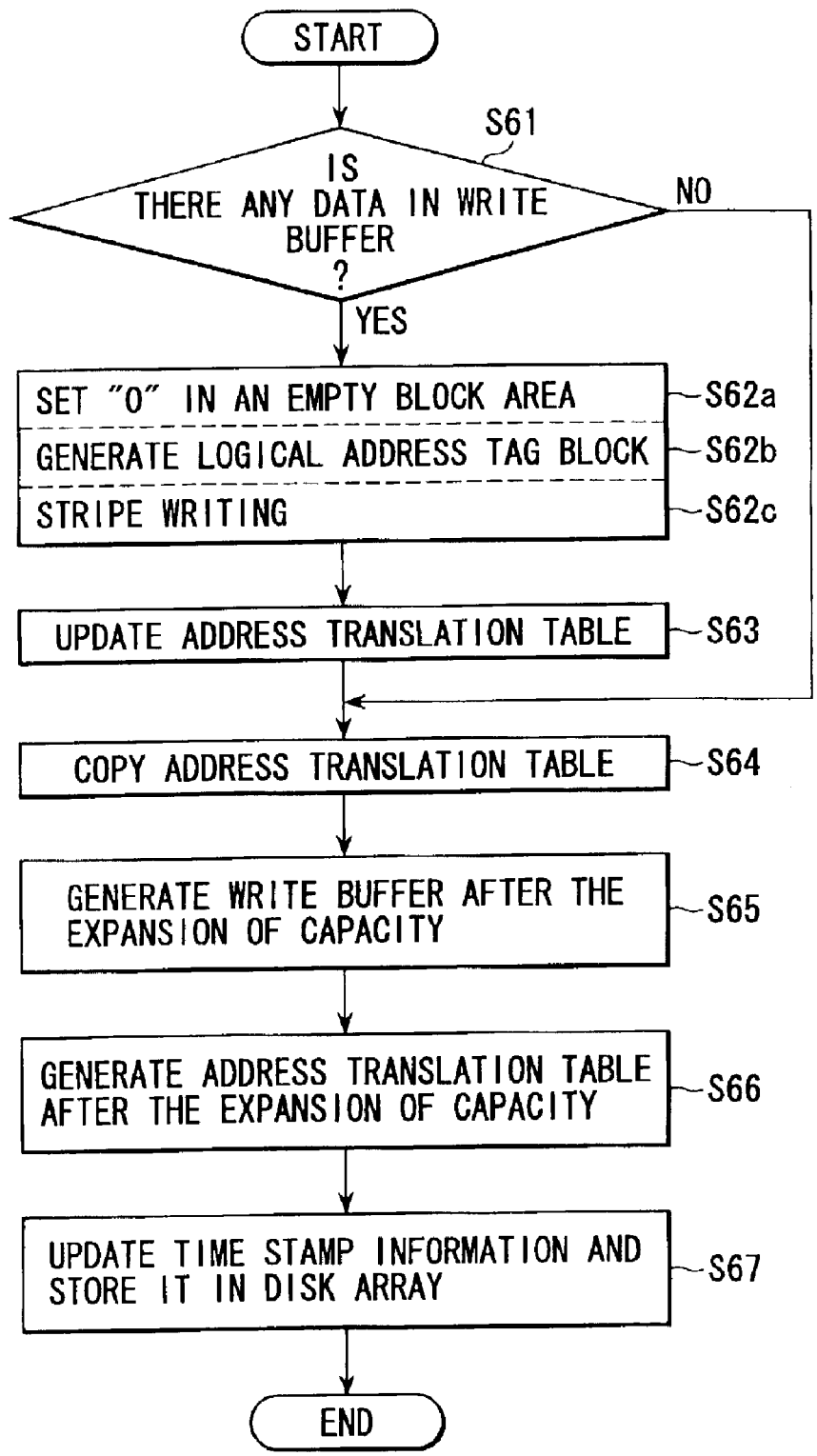
FIG. 14 is a flowchart to help explain a storage capacity expanding process applied to a third modification of the embodiment.

A storage capacity expanding process in a third modification of the embodiment of the invention will be explained by reference to a flowchart in FIG. 14. As seen from FIG. 14, a storage capacity expanding process in the third modification is realized by step S61 to step S66 corresponding to step S21 to step S26 in the flowchart of FIG. 7 and by step S67 corresponding to step S28 in the flowchart of FIG. 7. The third modification is characterized by not requiring a process corresponding to step S27 in the flowchart of FIG. 7 in the storage capacity expanding process of the second modification. Step S27 is the process of initializing to NULL the logical address tag block TG included in an empty stripe after the expansion of the storage capacity of the disk array 20. In the second modification, step S27 is carried out to determine whether the effective logical address tag block TG has been generated before or after the expansion of the storage capacity. In the third modification, however, whether the effective address tag block TG has been generated before or after the expansion of the storage capacity is determined by a checksum calculated from each logical address, time stamp, stripe generation number, and number of disk drives included in the tag block TG. Here, it can be further determined in what number of the order of storage capacity expansions the logical address tag block TG was generated. In the third modification, such a determination eliminates the necessity of initializing the logical address tag block TG to NULL in the storage capacity expanding process. Therefore, in the third modification, the inputs and outputs to and from the disk drives can be minimized, which enables the time required for the storage capacity expanding process to be shortened further.

Figure 15:
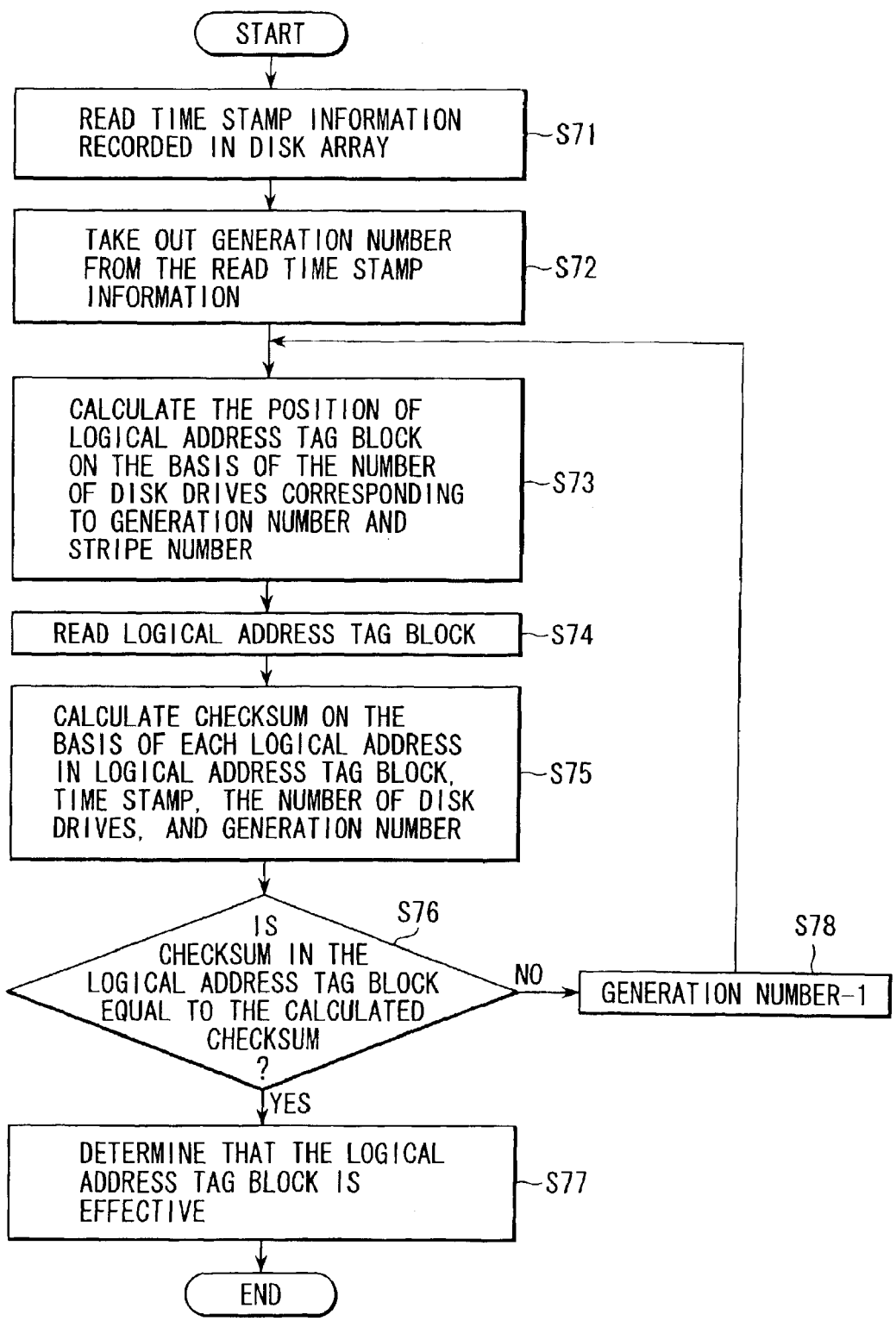
FIG. 15 is a flowchart to help explain the process of determining an effective logical address tag applied to the third modification of the embodiment.

Next, the process of distinguishing an effective logical address tag block applied to the third modification will be explained by reference to a flowchart in FIG. 15. The flowchart of FIG. 15 shows the process of finding an effective logical address tag block TG in one physical stripe on the disk array 20 after the expansion of the storage capacity. Therefore, executing the processes shown in the flowchart of FIG. 15 for all the physical stripes on the disk array 20 enables an effective logical address tag block TG for all of the physical stripes to be determined. The physical stripe including the logical address tag block TG to be distinguished is called a target physical stripe.

First, the controller 10 reads the time stamp information held in a special area of the disk array 20 (step S71). The time stamp information read here is the time stamp information at the time of the latest storage capacity expansion. Next, the controller 10 takes out the generation number from the read time stamp information (step S72). The controller 10 calculates the recorded position of the logical address tag block TG on the basis of the number of disk drives corresponding to the taken-out generation number and the physical stripe number of the target physical stripe (step S73). On the basis of the result of the calculation in step S73, the controller 10 reads the logical address tag block TG included in the physical stripe specified by the physical stripe number (step S74). The controller 10 assumes that the read logical address tag block TG is effective. Then, the controller 10 calculates a checksum from each logical address, time stamp, number of disk drives, and generation number included in the read logical address tag block TG (step S75). Then, the controller 10 determines whether the checksum in the read logical address tag block TG is equal to the checksum calculated in step S75 (step S76).

If the checksum in the read logical address tag block TG is equal to the calculated checksum (YES in step S76), the controller 10 determines that the logical address tag block TG is an effective block generated after the storage expansion shown by the generation number (step S77). In this case, the controller 10 ends the processing of the target physical stripe. Here, the position of an effective logical block and the position of an effective parity block in the physical stripe including the logical address tag block TG determined to be effective can be determined from the number of disk drives and the physical stripe number. In contrast, if the checksum in the read logical address tag block TG is not equal to the calculated checksum (NO in step S76), the controller 10 determines that the logical address tag block TG is ineffective. In this case, the controller 10 decrements the generation number by one (step S78) and returns to step S73. When the logical address tag block TG is determined to be ineffective even if step S78 is repeated until the generation number coincides with the initial value, it is determined that the target physical stripe is an empty stripe. In this case, the processing of one target physical stripe is completed. This is omitted in FIG. 15.

As described above, in the third modification, using the generation number and checksum makes it possible to detect an effective logical address tag block before the expansion of the storage capacity and an effective logical address tag block after the expansion of the storage capacity. Therefore, unlike the second modification, the third modification need not initialize the logical address tag block to NULL. Moreover, in the third modification, the effective logical address tag block used in a different storage capacity expansion can be detected correctly. Therefore, using the function of detecting an effective logical address tag block, a logical address tag block detecting process corresponding to step S33 to step S38 in the flowcharts of FIGS. 12A and 12B are carried out, which enables the address translation table 32 to be restructured when the nonvolatile memory 13 has failed, as in the second modification. Furthermore, when a failure has occurred in any one of the disk drives constituting the disk array 20, the data in the disk drive where a failure has occurred can be restored as in the second modification.

In the example of FIG. 1, each of the write buffer 31, address translation table 32, time stamp 33, buffer management table 34, copy 35 of address translation table, sorted address translation table 36 is placed on the nonvolatile memory 30. Each of these component parts, however, may be provided on a volatile memory. To do this, the volatile memory and a memory backup mechanism for preventing the stored contents of the volatile memory from being lost even when the power is off have to realize a nonvolatile memory equivalent to the nonvolatile memory 30. That is, each of the aforementioned component parts may be placed on a nonvolatile memory composed of the volatile memory and the memory backup mechanism.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk array apparatus with a disk array which has a redundant disk configuration composed of a plurality of disk drives and is recognized as a single logical disk drive by a host computer, the disk array apparatus comprising:

an address translation table which has address translation information set therein, the address translation information being used to translate the logical address of an effective logical block used by the host computer into a physical address in the disk array in which the logical block is stored;

means for updating the address translation table when the disk array is written into in stripes;

means for generating a copy of the address translation table at the time of a storage capacity expanding process of expanding the storage capacity of the disk array by adding a disk drive to the disk array;

a write buffer in which the data to be written into the disk array is stored temporarily and which is secured on a nonvolatile memory;

means for restructuring the write buffer so that the write buffer may have a size corresponding to the stripe size after the expansion of the storage capacity of the disk array, at the time of the storage capacity expanding process;

means for retrieving an effective logical address according to the copy of the address translation table;

means for reading the data in a physical stripe from the disk array, the physical stripe including a data block with a physical address corresponding to the effective logical address retrieved by the retrieving means;

means for storing the data in the logical blocks corresponding to all of the effective addresses included in the physical stripe read by the reading means into the restructured write buffer; and means for writing one stripe worth of data blocks corresponding to the stripe size after the expansion of the storage capacity into the disk array, the one stripe worth of data blocks including one stripe worth of logical blocks corresponding to the stripe size after the expansion of the storage capacity, and the one stripe worth of data blocks being written into an empty area different from an area in which the data to be updated has been stored, each time the one stripe worth of logical blocks of data is accumulated in the restructured write buffer.

2. The disk array apparatus according to claim 1, wherein the retrieving means retrieves effective addresses in the order of logical addresses according to the copy of the address translation table.

3. The disk array apparatus according to claim 1, further comprising means for writing one stripe worth of data blocks including the data accumulated in the write buffer forcibly into the disk array, when data has been accumulated in the write buffer at the time of the storage capacity expanding process.

4. A disk array apparatus with a disk array which has a redundant disk configuration composed of a plurality of disk drives and is recognized as one logical disk drive by a host computer, the disk array apparatus comprising:

an address translation table which has address translation information set therein, the address translation information being used to translate the logical address of an effective logical block used by the host computer into a physical address in the disk array in which the logical block is stored;

a write buffer in which the data to be written into the disk array is stored temporarily and which is secured on a nonvolatile memory;

means for storing the data specified by a write request made by the host computer in blocks into the write buffer;

means for writing one stripe worth of data blocks into the disk array, the one stripe worth of data blocks including one stripe worth of logical blocks and a logical address tag block, the logical address tag block including logical addresses corresponding to the one stripe worth of logical blocks in a one-to-one ratio, the one stripe worth of data blocks being written into an empty area different from an area in which the data to be updated has been stored in the disk array, according to a striping rule corresponding to the number of disk drives constituting the disk array, each time the one stripe worth of logical blocks of data is accumulated in the write buffer;

means for updating the address translation table when the disk array is written into in stripes;

means for generating a copy of address translation table at the time of a storage capacity expanding process of expanding the storage capacity of the disk array by adding a disk drive to the disk array;

means for restructuring the write buffer at the time of the storage capacity expanding process so that the write buffer may have a size corresponding to the stripe size after the expansion of the storage capacity of the disk array;

means for restructuring the address translation table into an address translation table used after the expansion of the storage capacity; and means for initializing the logical address tag block in each empty stripe in the disk array for the expansion of the storage capacity, each of said empty stripes being retrieved according to the copy of the address translation table, and the position of the logical address tag block in each of the empty stripes being determined according to a striping rule after the expansion of the storage capacity.

5. The disk array apparatus according to claim 4, wherein the address translation information, together with time information representing the setting time or updating time of the address translation information, is set in the address translation table, and the logical address tag block includes time information representing the time at which the physical stripe including the tag block is written into the disk array.

6. The disk array apparatus according to claim 5, further comprising:

means for recording time stamp information in a special area secured separately from an area for storing data in the disk array, the time stamp information including time information representing the time at which the storage capacity expanding process ends; and stripe decision means for determining, for each physical stripe in the disk array after the expansion of the storage capacity, whether the stripe is an effective physical stripe before the expansion of the storage capacity or an effective physical stripe after the expansion of the storage capacity by comparing the time information set together with the address translation information corresponding to the physical stripe in the address translation table with the time information in the time stamp information recorded in the special area.

7. The disk array apparatus according to claim 6, further comprising:

means for reading a physical stripe, as an object of stripe integration, from the disk array, when the stripe decision means determines that the physical stripe is an effective physical stripe before the expansion of the storage capacity; and block decision means for determining, for each logical address included in the logical address tag block in the physical stripe read as the object of stripe integration, whether the logical block in the physical stripe corresponding to the logical address is ineffective or effective by comparing the time information set together with the address translation information corresponding to the logical address in the restructured address translation table with the time information included in the logical address tag block, wherein said storing means stores into the restructured write buffer the logical blocks determined to be effective by the block decision means among the logical blocks in a plurality of physical stripes read as the objects of stripe integration, and the writing means writes one stripe worth of data blocks including the one stripe worth of logical blocks into the disk array according to a striping rule after the expansion of the storage capacity, when one stripe worth of logical blocks of data after the expansion of the storage capacity including the logical blocks determined to be effective by the block decision means is accumulated in the restructured write buffer.

8. The disk array apparatus according to claim 5, further comprising:

means for reading a logical address tag block from each physical stripe in the disk array according to a striping rule after the expansion of the storage capacity on the assumption that the physical stripe corresponding to the tag block is an effective physical stripe after the expansion of the storage capacity; and stripe decision means for determining, for each logical address tag block other than the logical address tag block remaining initialized according to the striping rule after the expansion of the storage capacity among the logical address tag blocks read by the reading means, whether the physical stripe corresponding to the tag block is an effective physical stripe after the expansion of the storage capacity or an effective physical stripe before the expansion of the storage capacity, by comparing the time information included in the logical address tag block with the time information included in the time stamp information recorded in the special area.

9. The disk array apparatus according to claim 5, further comprising:

means for generating a new initialized address translation table, when the address translation table becomes unusable;

logical address tag block detecting means for detecting an effective logical address tag block from each of the effective ones of the physical stripes in the disk array, the effective physical stripes being the physical stripes excluding the empty stripes whose logical address tag blocks remaining initialized according to the striping rule after the expansion of the storage capacity among the physical stripes in the disk array; and address translation information decision means for determining, for each logical address included in each logical address tag block detected by the logical address tag block detecting means, whether the address translation information corresponding to the logical address is effective, by comparing the time information set together with the address translation information corresponding to the logical address in the new address translation table with the time information included in the logical address tag block including the logical address, wherein the updating means updates the address translation information and time information in the new address translation table, when the address translation information decision means determines that the address translation information is ineffective.

10. The disk array apparatus according to claim 9, wherein the logical address tag block detecting means further includes first logical address tag block reading means for reading, for each physical stripe in the disk array, a logical address tag block from the stripe according to the striping rule after the expansion of the storage capacity on the assumption that the physical stripe corresponding to the tag block is an effective physical stripe after the expansion of the storage capacity, means for verifying the truth of the assumption that the physical stripe corresponding to the logical address tag block is an effective physical stripe after the expansion of the storage capacity by comparing the time information included in the logical address tag block with the time information included in the time stamp information recorded in the special area for each logical address tag block excluding the logical address tag block remaining initialized according to the striping rule after the expansion of the storage capacity among the logical address tag blocks read by the first logical address tag block reading means, second logical address tag block reading means for reading a logical address tag block according to the striping rule before the expansion of the storage capacity from the physical stripe, when the assumption that the physical stripe is an effective physical stripe after the expansion of the storage capacity is false, means for using a logical address tag block read from the physical address by the first logical address tag block reading means, when the assumption that the physical stripe is an effective physical stripe after the expansion of the storage capacity is true, and means for using a logical address tag block read from the physical address by the second logical address tag block reading means, when the assumption that the physical stripe is an effective physical stripe after the expansion of the storage capacity is false.

11. The disk array apparatus according to claim 5, further comprising:

means for retrieving, according to the restructured address translation table, an effective logical address allocated to a physical block existing on any one of the plurality of disk drives constituting the disk array that fails, when the disk array is restructured by using a spare disk drive in place of the failing disk drive;

stripe decision means for determining, for each logical address retrieved by the retrieving means, whether the physical stripe corresponding to the logical address is an effective physical stripe before the expansion of the storage capacity or an effective physical stripe after the expansion of the storage capacity by comparing the time information set together with the address translation information corresponding to the logical address in the restructured address translation table with the time information included in the time stamp information recorded in the special area for each logical address retrieved by the retrieving means, and means for restoring the data corresponding to the logical address for each logical address retrieved by the retrieving means according to the striping rule before or after the expansion of the storage capacity according to the result of the determination made by the stripe decision means.

12. A disk array apparatus with a disk array which has a redundant disk configuration composed of a plurality of disk drives and is recognized as one logical disk drive by a host computer, the disk array apparatus comprising:

an address translation table which has address translation information set therein, the address translation information being used to translate the logical address of an effective logical block used by the host computer into a physical address in the disk array in which the logical block is stored, and which also has time information representing the setting time or updating time of the address translation information set therein, pairing the time information with the address translation information;

a write buffer which temporarily stores the data to be written into the disk array and is secured on a nonvolatile memory;

means for storing the data specified by a write request made by the host computer in blocks into the write buffer;

means for writing one stripe worth of data blocks into the disk array, the one stripe worth of data blocks including one stripe of logical blocks and a logical address tag block, the logical address tag block being composed of a set of a logical address tag including the logical addresses corresponding to the respective ones of the one stripe worth of logical blocks and time stamp information, the time stamp information including time information representing the time at which the physical stripe including the logical address tag block corresponding to the time stamp information is written into the disk array and the generation number representing the number of times the storage capacity of the disk array is expanded, a checksum corresponding to the time stamp information and the logical address tag paired with the time stamp information being added to the time stamp information, and the one stripe worth of data blocks being written into an empty area different from the area into which the data to be updated has been stored in the disk array, according to a striping rule corresponding to the number of disk drives constituting the disk array, each time the one stripe worth of logical blocks of data is accumulated in the write buffer;

means for updating the address translation table, when the disk array is written into in stripes;

means for generating a copy of the address translation table at the time of a storage capacity expanding process of expanding the storage capacity of the disk array by adding a disk drive to the disk array:

means for restructuring the write buffer so that the write buffer may have a size corresponding to the stripe size after the expansion of the storage capacity of the disk array;

means for restructuring the address translation table into an address translation table used after the expansion of the storage capacity; and means for recording time stamp information in a special area secured separately from an area into which data is recorded in the disk array, the time stamp information recorded in the special area including information representing the time at which the storage capacity expanding process ends and the generation number representing the number of storage capacity expansions.

13. The disk array apparatus according to claim 12, further comprising:

means for reading the logical address tag block included in the physical stripe from each physical stripe included in the disk array, on the basis of the number of disk drives constituting the disk array and the physical stripe number of the physical stripe including the logical address tag block, the number of disk drives constituting the disk array being determined from the generation number included in the time stamp information recorded in the special area;

means for calculating a checksum from the logical address tag and time stamp information included in a logical address tag block, each time the reading means reads the logical address tag block;

means for determining whether the logical address tag block is effective or ineffective, each time the reading means reads a logical address tag block, by comparing the checksum included in the logical address tag block with the checksum calculated by the calculating means;

means for detecting an effective logical address tag block according to the result of the determination made by the determining means; and means for controlling the re-reading of a logical address tag block by the reading means, when the determining means determines that the logical address tag block is ineffective, the controlling means changing the generation number determining the number of disk drives constituting the disk array to the number of the preceding generation, thereby to re-read by the reading means.

14. A method of expanding dynamically the storage capacity of a disk array which has a redundant disk configuration composed of a plurality of disk drives and is recognized as a single logical disk drive by a host computer, the method comprising:

updating an address translation table when the disk array is written into in stripes, the address translation table having address translation information set therein, the address translation information being used to translate the logical address of an effective logical block used by the host computer into a physical address in the disk array in which the logical block is stored;

generating a copy of the address translation table at the time of a storage capacity expanding process of expanding the storage capacity of the disk array by adding a disk drive to the disk array;

restructuring a write buffer for storing temporarily the data to be written into the disk array so that the write buffer may have a size corresponding to the stripe size after the expansion of the storage capacity of the disk array;

retrieving effective logical addresses sequentially according to the copy of the address translation table;

reading the physical stripe including a data block with the physical address corresponding to the logical address from the disk array each time the effective logical address is retrieved;

storing into the restructured write buffer the data in the logical block corresponding to at least one effective logical address included in the physical stripe read from the disk array;

generating a logical address tag block including the logical address corresponding to the one stripe worth of logical blocks each time one stripe worth of logical blocks of data corresponding to the stripe size after the expansion of the storage capacity is accumulated in the restructured write buffer; and writing one stripe worth of data blocks including the generated logical address tag block and the one stripe worth of logical blocks corresponding to the tag block into an empty area different from the area in which the data to be updated has been stored in the disk array.

15. A method of expanding dynamically the storage capacity of a disk array which has a redundant disk configuration composed of a plurality of disk drives and is recognized as a single logical disk drive by a host computer, the method comprising:

storing the data specified by a write request made by the host computer in blocks into a write buffer;

generating a logical address tag block including a logical address corresponding to one stripe worth of logical blocks each time the one stripe worth of logical blocks of data is accumulated in the write buffer;

writing one stripe worth of data blocks including the generated logical address tag block and the one stripe worth of logical blocks corresponding to the tag block into an empty area different from the area in which the data to be updated has been stored in the disk array according to a striping rule corresponding to the number of disk drives constituting the disk array;

updating an address translation table when the disk array is written into in stripes, the address translation table having address translation information set therein, the address translation information being used to translate the logical address of an effective logical block used by the host computer into a physical address in the disk array in which the logical block is stored;

generating a copy of the address translation table at the time of a storage capacity expanding process of expanding the storage capacity of the disk array by adding a disk drive to the disk array;

restructuring the write buffer so that the write buffer may have a size corresponding to the stripe size after the expansion of the storage capacity of the disk array;

restructuring the address translation table into an address translation table used after the expansion of the storage capacity; and initializing the logical address tag block in each empty stripe in the disk array for the expansion of the storage capacity, each of the empty stripe being retrieved according to the copy of the address translation table and the position of the logical address tag block in each of the empty stripes being determined according to a striping rule after the expansion of the storage capacity.

16. The method according to claim 15, wherein the address translation information, together with information representing the setting time or updating time of the address translation information, is set in the address translation table, and the logical address tag block includes time information representing the time at which the physical stripe including the tag block is written into the disk array.

17. The method according to claim 16, further comprising:

recording time stamp information in a special area secured separately from an area in which data is recorded in the disk array, at the time of the initialization of the logical address tag block, the time stamp information including time information representing the time at which the storage capacity expanding process ends; and determining whether each physical stripe in the disk array after the expansion of the storage capacity is an effective physical stripe before the expansion of the storage capacity or an effective physical stripe after the expansion of the storage capacity by comparing the time information set together with the address translation information corresponding to the physical stripe in the address translation table with the time information in the time stamp information recorded in the special area.

18. A method of expanding dynamically the storage capacity of a disk array which has a redundant disk configuration composed of a plurality of disk drives and is recognized as a single logical disk drive by a host computer, the method comprising:

storing the data specified by a write request made by the host computer in blocks into a write buffer;

generating a logical address tag block including a logical address corresponding to one stripe worth of logical blocks each time the one stripe worth of logical blocks of data is accumulated in the write buffer;

writing one stripe worth of data blocks including the generated logical address tag block and the one stripe worth of logical blocks corresponding to the tag block into an empty area different from the area in which the data to be updated has been stored in the disk array according to a striping rule corresponding to the number of disk drives constituting the disk array, the logical address tag block being composed of a set of a logical address tag including the logical addresses corresponding to the one stripe work of logical blocks respectively and time stamp information, the time stamp information including time information representing the time at which the physical stripe including the logical address tag block corresponding to the time stamp information is written into the disk array and the generation number representing the number of times the storage capacity of the disk array was expanded, and a checksum corresponding to the time stamp information and the logical address tag paired with the time stamp information being added to the time stamp information;

updating an address translation table when the disk array is written into in stripes, the address translation table having address translation information set therein, the address translation information being used to translate the logical address of an effective logical block used by the host computer into a physical address in the disk array in which the logical block is stored, and further having time information set therein, the time information representing the setting time or updating time of the address translation information and being paired with the address translation information;

generating a copy of the address translation table at the time of a storage capacity expanding process of expanding the storage capacity of the disk array by adding a disk drive to the disk array;

restructuring the write buffer so that the write buffer may have a size corresponding to the stripe size after the expansion of the storage capacity of the disk array;

restructuring the address translation table into an address translation table used after the expansion of the storage capacity; and recording time stamp information in a special area secured separately from an area in which data is stored in the disk array, the time stamp information recorded in the special area including time information representing the time at which the disk array expanding process ends and the generation number representing the number of storage capacity expansions.

19. The method according to claim 18, further comprising:

reading the logical address tag block included in the physical address from each physical stripe in the disk array on the basis of the number of disk drives constituting the disk array and the physical stripe number of the physical stripe including the logical address tag block, the number of disk drives constituting the disk array being determined by the generation number included in the time stamp information recorded in the special area;

calculating a checksum from the logical address tag and time stamp information included in the logical address tag block each time the logical address tag block is read;

determining whether the logical address tag block is effective or ineffective each time the logical address tag block is read, by comparing the checksum included in the logical address tag block with the calculated checksum;

detecting an effective logical address block according to the result of the determination; and changing the generation number determining the number of disk drives constituting the disk array to the number of the preceding generation to read a logical address tag block again, when the logical address tag block is determined to be ineffective.

* * * * *